US012739442B2

(12) United States Patent
Hu et al.

(10) Patent No.: US 12,739,442 B2
(45) Date of Patent: Sep. 15, 2026

(54) FILTERING IN PARALLEL WITH DEBLOCKING FILTERING IN VIDEO CODING

(71) Applicant: QUALCOMM Incorporated, San Diego, CA (US)

(72) Inventors: Nan Hu, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 18/346,613

(22) Filed: Jul. 3, 2023

(65) Prior Publication Data

US 2024/0015337 A1 Jan. 11, 2024

Related U.S. Application Data

(60) Provisional application No. 63/358,496, filed on Jul. 5, 2022.

(51) Int. Cl.
*H04N 19/86* (2014.01)
*H04N 19/117* (2014.01)
*H04N 19/176* (2014.01)

(52) U.S. Cl.
CPC ........... *H04N 19/86* (2014.11); *H04N 19/117* (2014.11); *H04N 19/176* (2014.11)

(58) Field of Classification Search
CPC ..... H04N 19/117; H04N 19/176; H04N 19/86
See application file for complete search history.

(56) References Cited

U.S. PATENT DOCUMENTS

2019/0306534 A1* 10/2019 Zhang .................. H04N 19/117
2020/0296364 A1* 9/2020 Rusanovskyy ...... H04N 19/176
2022/0201292 A1 6/2022 Karczewicz et al.
2023/0010869 A1 1/2023 Hu et al.
2023/0300328 A1 9/2023 Hu
2024/0040116 A1* 2/2024 Yin ........................ H04N 19/82

FOREIGN PATENT DOCUMENTS

WO WO-2013047325 A1 * 4/2013 ............. H04N 19/86

OTHER PUBLICATIONS

"Bilateral Loop Filter in Combination with SAO"—Strom et al., 2019 Picture Coding Symposium (PCS), Nov. 12-15, 2019, Ningbo, China (Year: 2019).*

(Continued)

*Primary Examiner* — Mainul Hasan
(74) *Attorney, Agent, or Firm* — Shumaker & Sieffert, PA

(57) ABSTRACT

A device for decoding video data may be configured to apply a deblocking filter to a block of video data to determine a first filtered block; apply a second filter to the block of video data in parallel with the deblocking filter to determine a second filtered block, wherein the second filter comprises one of a guided filter, a bilateral filter, or an adaptive loop filter; combine the first filtered block and the second filtered block to determine a combined block; apply a third filter to the combined block to determine a third filtered block; process the third filtered block to determine a decoded version of the block of video data; and output the decoded version of the block of video data.

30 Claims, 21 Drawing Sheets

(56) References Cited

OTHER PUBLICATIONS

"Adaptive Guided Image Filter for Improved In-Loop Filtering in Video Coding"—Chen et al., MMSP'15, Oct. 19-Oct. 21, 2015, Xiamen, China. (Year: 2015).*
"Comparison of Different Parallel Implementations for Deblocking Filter of HEVC"—Kotra et al., 978-1-4799-0356-6/13/$31.00 A © 2013 IEEE. (Year: 2013).*
Andersson K., et al., "EE1-Related: Combination of VVC Deblocking and NN loop Filtering," JVET-Y0098-v2, Joint Video Experts Team (JVET)of ITU-T SG 16 WP 3 and ISO/IEC JTC 1/SC 29, 25th Meeting, by teleconference, Jan. 12-21, 2022, pp. 1-5.
Chang Y-J., et al., "Compression Efficiency Methods Beyond VVC," JVET-U0100, Joint Video Experts Team (JVET) of ITU-T SG 16 WP 3 and ISO/IEC JTC 1/SC 29, 21st Meeting, by Teleconference, Jan. 6-15, 2021, XP030293237, pp. 1-13.
Chen J., et al., "Algorithm Description for Versatile Video Coding and Test Model 4 (VTM 4)," 13th JVET Meeting, Jan. 9, 2019-Jan. 18, 2019, Marrakech, (The Joint Video Exploration Team of ISO/IEC JTC1/SC29/WG11 and ITU-T SG. 16 WP3), No. JVET-M1002-v2, Mar. 19, 2019 (Mar. 19, 2019), XP030255391, pp. 1-62.
Chen J., et al., "Algorithm Description of Joint Exploration Test Model 7 (JEM7)," 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, N17055, Aug. 19, 2017, XP030150980, 50 Pages, XP030023716.
Coban M., et al., "Algorithm Description of Enhanced Compression Model 3 (ECM 3)," 23rd JVET Meeting, Teleconference, (The Joint Video Exploration Team of ISO/IEC JTC1/SC29/WG11 and ITU-T SG.16), No. JVET-X2025-v2, m58426, Jan. 7, 2022, pp. 1-28, Jul. 7-16, 2021, XP030302175.
Coban M., et al., "Algorithm Description of Enhanced Compression Model 4 (ECM 4)," JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.
Coban M., et al., "Preliminary Draft of Algorithm Description for Enhanced Compression Model 1 Software (ECM 1)," JVET-W0102-v2, Joint Video Expelts Team (JVET) of ITU-T SG 16 WP 3 and ISO/IEC JTC 1/SC 29, 23rd Meeting by Teleconference Jul. 7-16, 2021, pp. 1-18.
Du J., et al., "A Parallel and Area-Efficient Architecture for Deblocking Filter and Adaptive Loop Filter," IEEE, 2011, pp. 945-948.
Hu N., et al., "AHG12: Using Samples Before Deblocking Filter for Adaptive Loop Filter," JVET-Z0146-v1, Joint Video Experts Team (JVET) of ITU-T SG 16 WP 3 and ISO/IEC JTC 1/SC 29, 26th Meeting, by teleconference, Apr. 20-29, 2022, pp. 1-4.
Ikai T., et al., "CE8.1: DF-Combined Adaptive Loop Filter," JCTVC-E140, WG11 No. m19657, Joint Collaborative Team on Video Coding (JCT-VC) ofiTU-T SG16 WP3 and ISO/IEC JTC1/SC29/WG11, 5th Meeting: Geneva, Switzerland, Mar. 16-23, 2011, pp. 1-4.
International Search Report and Written Opinion—PCT/US2023/069623—ISA/EPO—Sep. 25, 2023 11 Pages.
ITU-T H.265: "Series H: Audiovisual and Multimedia Systems Infrastructure of Audiovisual Services—Coding of Moving Video," High Efficiency Video Coding, the International Telecommunication Union, Jun. 2019, 696 Pages.
ITU-T H.266: "Series H: Audiovisual and Multimedia Systems Infrastructure of Audiovisual Services—Coding of Moving Video," Versatile Video Coding, the International Telecommunication Union, Aug. 2020, 516 pages.
Li Y., et al., "EE1-1.6: Combined Test of EE1-1.2 and EE1-1.4," JVET-X0066, Qualcomm, ByteDance, Oct. 6, 2021, 10 Pages.
Liu S., et al., "JVET Common Test Conditions and Evaluation Procedures for Neural Network-based Video Coding Technology," JVET-X2016-v1, Joint Video Experts Team (JVET) of ITU-T SG 16 WP 3 and ISO/IEC JTC 1/SC 29, 24th Meeting, by teleconference, Oct. 6-15, 2021, pp. 1-10.
Poirier T., et al., "AHG7: GDR in ECM-4.0," Joint Video Experts Team (JVET) of ITU-T SG 16 WP 3 and ISO/IEC JTC 1/SC 29, 26th Meeting, by teleconference, Apr. 20-29, 2022, No. JVET-Z0141-v4, JVET-Z0141-v3, pp. 1-3.

* cited by examiner

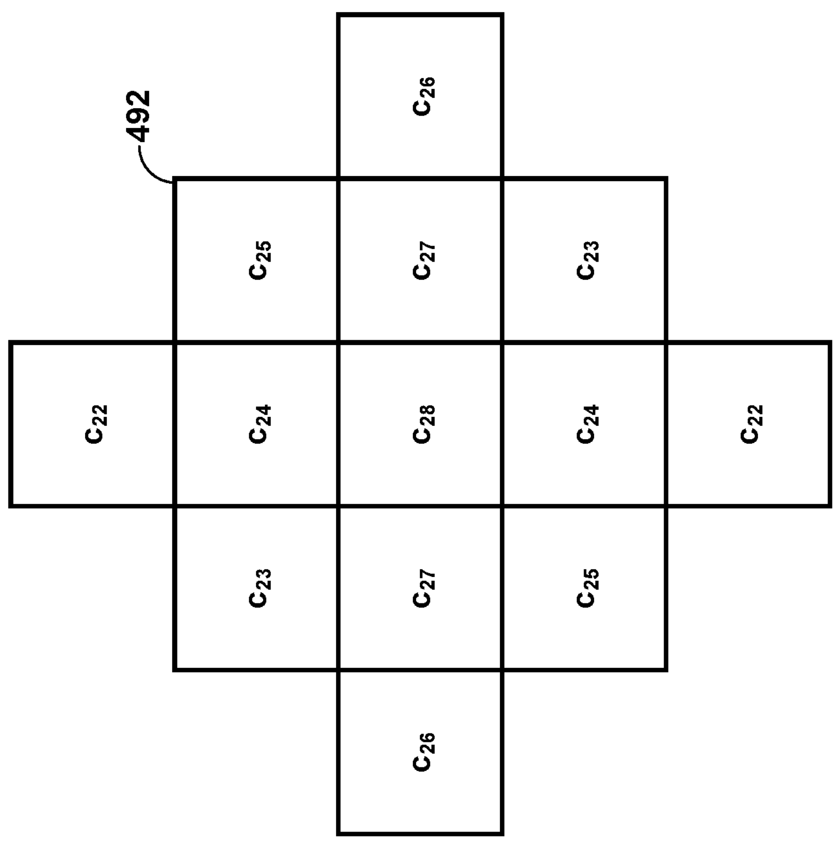
FIG. 14
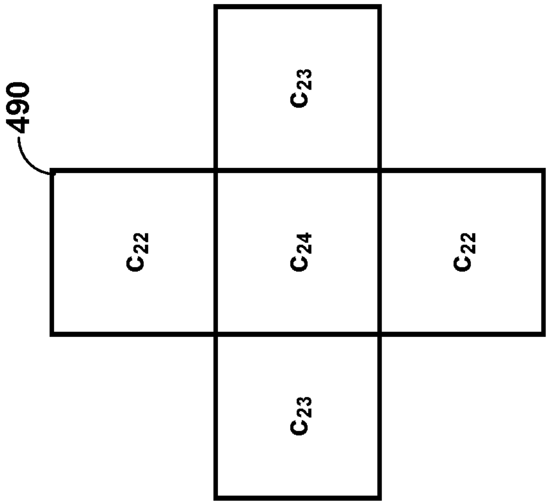

FILTERING IN PARALLEL WITH DEBLOCKING FILTERING IN VIDEO CODING

This application claims the benefit of U.S. Provisional Patent Application No. 63/358,496, filed 5 Jul. 2022, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

According to the techniques of this disclosure, video encoders and video decoders may be configured to perform additional filtering in parallel with deblocking filtering and combining the results of the two parallel filters. Then, rather than buffering both the pre-deblocked samples and the post-deblocked samples, the video encoder or video decoder may only need to buffer the combined results. Thus, by applying a deblocking filter to a block of video data to determine a first filtered block, applying a second filter to the block of video data in parallel with the deblocking filter to determine a second filtered block, and combining the first filtered block and the second filtered block to determine a combined block, a video encoder or video decoder may reduce the buffer, e.g., memory, requirements associated with the filtering stage of video decoding by eliminating the need to store pre-deblocked samples for use in a later stage, e.g., ALF, of the filtering pipeline.

According to an example of this disclosure, a method for decoding video data includes applying a deblocking filter to a block of video data to determine a first filtered block; applying a second filter to the block of video data in parallel with deblocking filter to determine a second filtered block, wherein the second filter comprises one of a guided filter, a bilateral filter, or an adaptive loop filter; combining the first filtered block and the second filtered block to determine a combined block; applying a third filter to the combined block to determine a third filtered block; processing the third filtered block to determine a decoded version of the block of video data; and outputting the decoded version of the block of video data.

According to an example of this disclosure, a device for decoding video data includes a memory system configured to store video data; and a processing system coupled to the memory system, implemented in circuitry, and configured to: apply a deblocking filter to a block of video data to determine a first filtered block; apply a second filter to the block of video data in parallel with the deblocking filter to determine a second filtered block, wherein the second filter comprises one of a guided filter, a bilateral filter, or an adaptive loop filter; combine the first filtered block and the second filtered block to determine a combined block; apply a third filter to the combined block to determine a third filtered block; process the third filtered block to determine a decoded version of the block of video data; and output the decoded version of the block of video data.

A computer-readable storage medium stores instructions that when executed by one or more processors cause the one or more processors to apply a deblocking filter to a block of video data to determine a first filtered block; apply a second filter to the block of video data in parallel with the deblocking filter to determine a second filtered block, wherein the second filter comprises one of a guided filter, a bilateral filter, or an adaptive loop filter; combine the first filtered block and the second filtered block to determine a combined block; apply a third filter to the combined block to determine a third filtered block; process the third filtered block to determine a decoded version of the block of video data; and output the decoded version of the block of video data.

According to an example of this disclosure, a device for decoding video data includes means for applying a deblocking filter to a block of video data to determine a first filtered block; means for applying a second filter to the block of video data in parallel with deblocking filter to determine a second filtered block, wherein the second filter comprises one of a guided filter, a bilateral filter, or an adaptive loop filter; means for combining the first filtered block and the second filtered block to determine a combined block; means for applying a third filter to the combined block to determine a third filtered block; means for processing the third filtered block to determine a decoded version of the block of video data; and means for outputting the decoded version of the block of video data.

The details of one or more examples are set forth in the accompanying drawings and the description below. Other features, objects, and advantages will be apparent from the description, drawings, and claims.

BRIEF DESCRIPTION OF DRAWINGS

FIG. 14 shows an example of proposed 3×3 and 5×5 filter shapes, which may be applied to samples before deblocking filtering.

DETAILED DESCRIPTION

Figure 1:
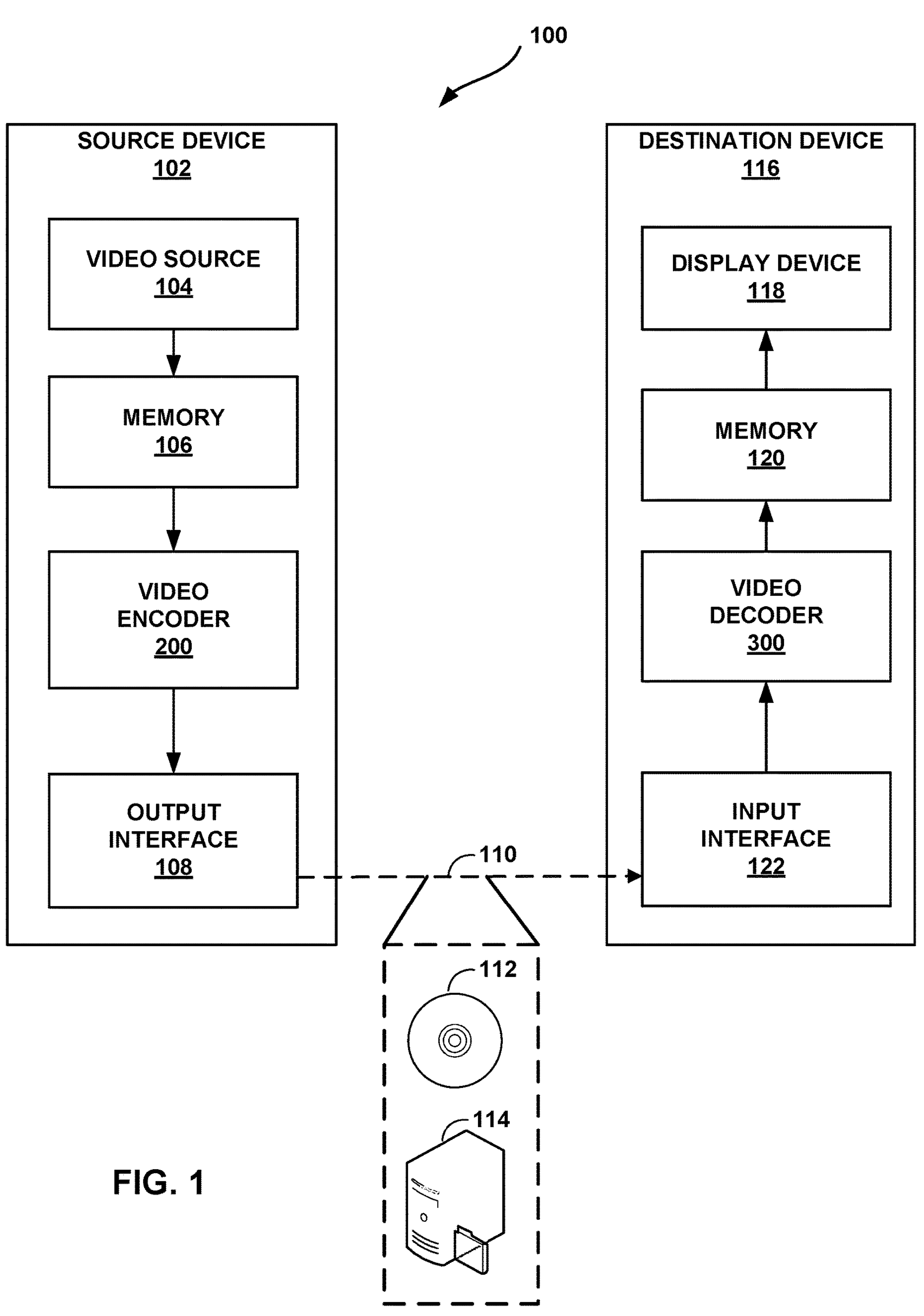
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). A video decoder may, for example, apply ALF to minimize the mean square error between filtered samples and original samples. Parameters for these filtering operations may either be determined by a video encoder and explicitly signaled in the encoded video bitstream or may be implicitly determined by a video decoder without needing the parameters to be explicitly signaled in the encoded video bitstream.

One common implementation of reconstructed block filtering is to serially perform deblocking filtering, followed by SAO, followed by ALF. Various implementations of ALF, described in more detail below, utilize pre-deblocked samples in the ALF stage. As the ALF stage is performed after deblocking filtering and SAO in the filtering pipeline, these pre-deblocked samples have to be buffered, e.g., stored in a buffer, while deblocking filtering and SAO are being performed. SAO and deblocking filtering may each also produce intermediate results that need to be buffered. These buffering requirements increase processing requirements and hardware complexity, particularly for hardware-based video decoders.

According to the techniques of this disclosure, video encoders and video decoders may be configured to perform additional filtering in parallel with deblocking filtering and combining the results of the two parallel filters. Then, rather than buffering both the pre-deblocked samples and the post-deblocked samples, the video encoder or video decoder may only need to buffer the combined results. Thus, by applying a deblocking filter to a block of video data to determine a first filtered block, applying a second filter to the block of video data in parallel with the deblocking filter to determine a second filtered block, and combining the first filtered block and the second filtered block to determine a combined block, a video encoder or video decoder may reduce the buffer, e.g., memory, requirements associated with the filtering stage of video decoding by eliminating the need to store pre-deblocked samples for use in a later stage, e.g., ALF, of the filtering pipeline.

In this context, "parallel" means that the data for the two parallel filters may be processed independently. That is, in some implementations, the additional filter may not utilize or require data generated by the deblocking filter, such that the two filtering processes can be applied independently. The two filtering processes may thus be fully, or partially, performed at the same time.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for ALF with multiple classifiers. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for ALF with multiple classifiers. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using a processing system of one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that uses filters with multiple classifiers.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an MxN block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
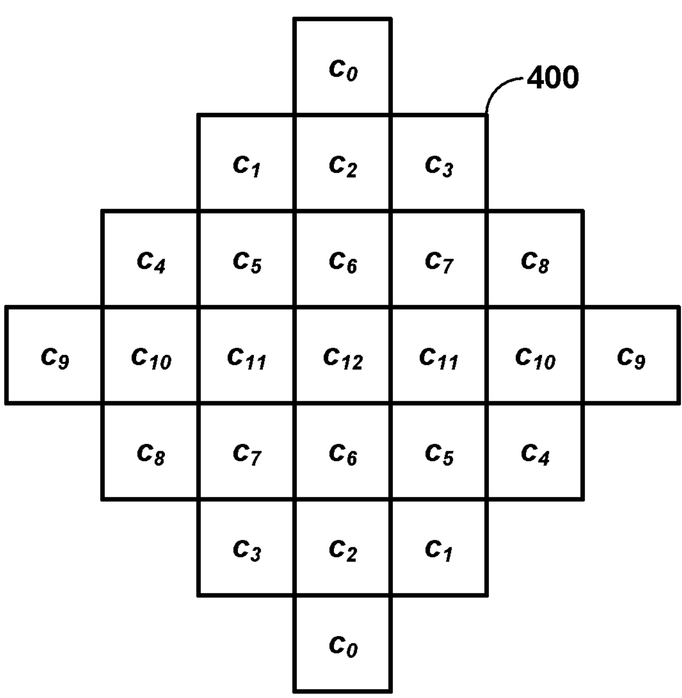
FIG. 2 shows an example of adaptive loop filter (ALF) shapes.
Figure 2:
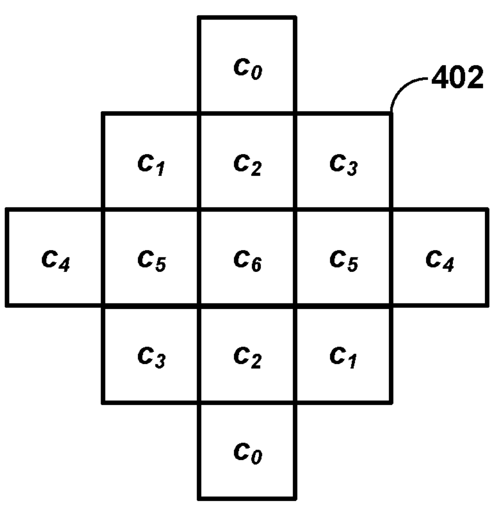

As introduced above, video encoder 200 and video decoder 300 may be configured to perform various types of filtering on a reconstructed block, including ALF. In VVC, ALF may be applied to minimize the mean square error between original samples and filtered samples. Existing implementations of ALF, use samples that have already been filtered by SAO and/or deblocking filtering (DBF). In some examples, the input samples of an ALF are the output samples of an SAO filter. The output samples of an ALF are stored in a decoded picture buffer (DPB) or sent out as output pictures. The filter shapes of the ALF adopted in the joint exploration model (JEM) software were 5×5, 7×7 and 9×9 diamond shapes. Video encoder 200 may select and signal the filter shape at the picture level. To obtain a better trade-off between coding efficiency and filter complexity, in VVC, only a 7×7 diamond shape 400 and a 5×5 diamond shape 402 are supported for luma and chroma components, respectively, as shown in FIG. 2. FIG. 2 shows example ALF filter shapes in VVC version 1.

In one example, for each filter, an integer coefficient $c_i$ is represented with 7-bit fractional precision. The absolute value of $c_i$ is coded by using a $0^{th}$ order Exp-Golomb code followed by a sign bit for a non-zero coefficient. In FIG. 2, each square corresponds to a luma sample or chroma sample and the center square corresponds to a current, to-be-filtered sample. To reduce the overhead associated with sending coefficients and the number of multiplications, the filter shapes in FIG. 2 are point-symmetrical. In addition, as shown in equation (1), the sum of all filter coefficients shall be equal to 128, which is the fixed-point representation of 1.0 with 7-bit fractional precision.

$$2\sum_{i=0}^{N-2} c_i + c_{N-1} = 128 \tag{1}$$

In equation (1), N is the number of coefficients and N is equal to 13 and 7 for 7×7 and 5×5 filter shapes, respectively.

In VVC, nonlinearity is introduced to ALF. Video encoder 200 and video decoder 300 may apply a simple clipping function to reduce the impact of a neighboring sample value when the difference between the neighboring sample value and a current, to-be-filtered sample value is too large. To filter a sample, the ALF process is performed as:

$$\tilde{R}(x, y) = R(x, y) + \left[\sum_{i=0}^{N-2} c_i(f_{i,0} + f_{i,1}) + 64\right] \gg 7 \tag{2}$$

where R(x, y) is a sample value after SAO filtering.

The Non-Linear Function is Defined with a Clipping Functions as:

$$f_{i,j} = \min(b_i, \max(-b_i, R(x + x_{i,j}, y + y_{i,j}) - R(x, y))) \tag{3}$$

where j is equal to 0 or 1, and $(x_{i,j}, y_{i,j})$ are filter tap position offsets of the ith coefficient $c_i$.

In VVC version 1, as in equation (4), the clipping parameter $b_i$ for a coefficient $c_i$ is determined by a clipping index $d_i$. In equation (4), BD is the internal bit depth.

$$b_i = \begin{cases} 2^{BD}, & \text{when } d_i = 0 \\ 2^{BD-1-2d_i}, & \text{otherwise} \end{cases} \tag{4}$$

In a filter, both the number of signaled coefficients and the number of signaled clipping indices are N−1. In one example, each coefficient is limited in the range of [−128, 127], which is equivalent to [−1.0, 1.0) with 7-bit fractional precision. In one example, each clipping index $d_i$ can be 0, 1, 2 or 3 and is signaled by using a two-bit fixed length code. To simplify the clipping operation, as in equation (4), the value of a clipping parameter $b_i$ can only be a power of 2. Therefore, simple bit-wise logical operations can be applied as clipping operations.

Figure 3:
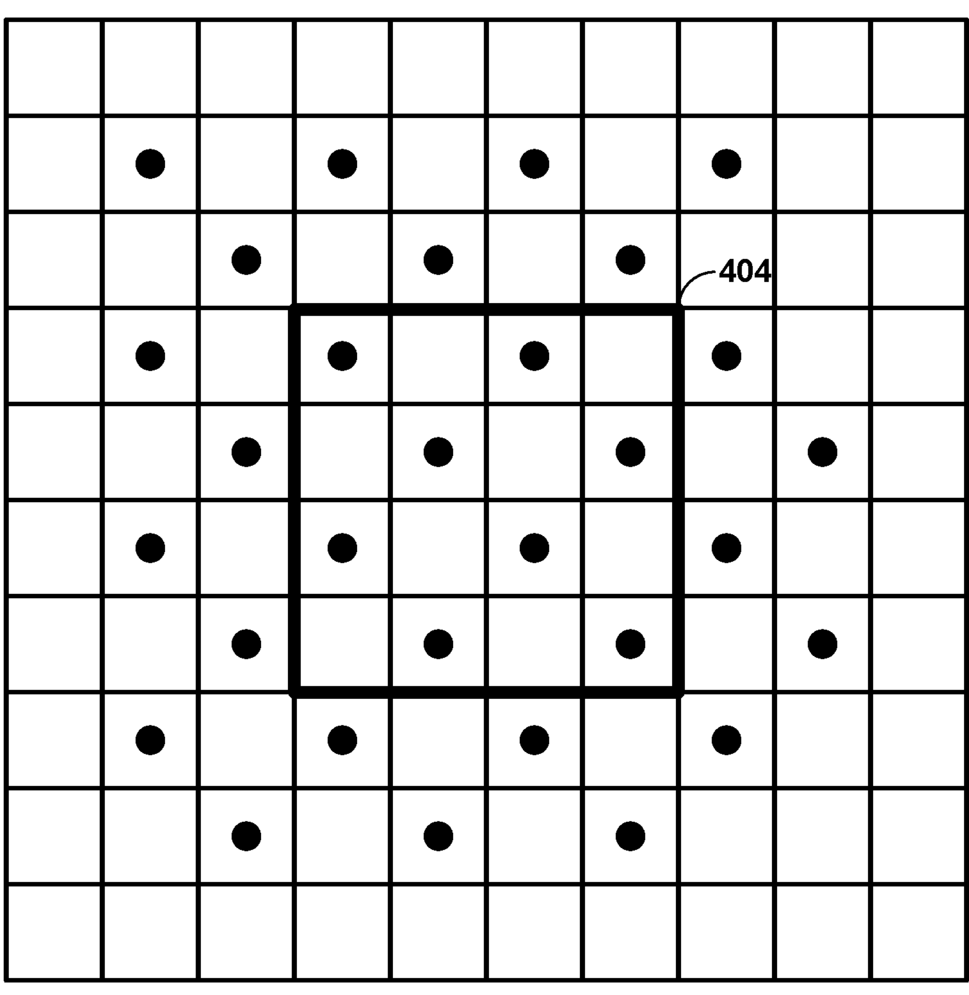
FIG. 3 shows an example of subsampled Laplacian values for sub-block ALF classification.
Figure 4:
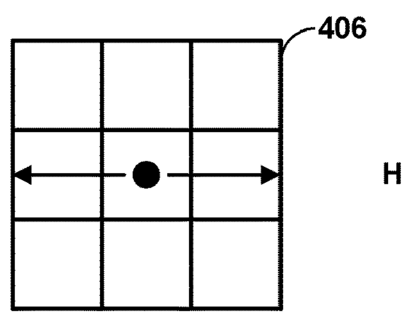
FIG. 4. shows Laplacian values for a luma sample.
Figure 4:
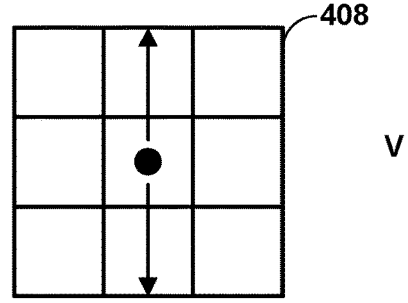
Figure 4:
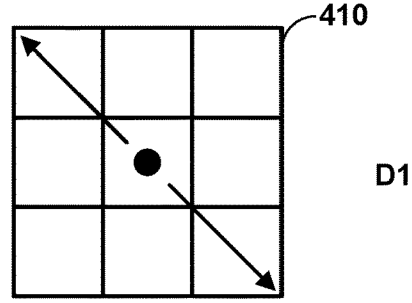
Figure 4:
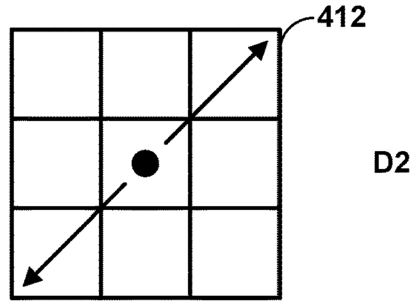

Video encoder 200 and video decoder 300 may be configured to perform sub-block level filter adaptation. In VVC version 1, ALF follows the same luma classification framework as ALF in JEM-7.0. To obtain a better tradeoff between coding efficiency and calculation complexity, the block size for classification may be increased to 4×4 samples from 2×2 samples. To determine the class index of a 4×4 block, a surrounding window with 8×8 luma samples is employed to derive direction and activity information. In this 8×8 luma samples window, four gradient values of every second sample are first calculated, as shown in FIG. 3. FIG. 3 illustrates subsampled Laplacian values for a 4×4 sub-block 404 for ALF classification. Gradient values of samples marked with a dot are calculated. Gradient values of other samples are set to 0. For each sample with coordinates (k,l), FIG. 4 illustrates the four gradient values: horizontal gradient H 406, vertical gradient V 408, 135 degree gradient D1 410, and 45 degree gradient D2 412, which are derived as:

$$H_{k,l} = |2R(k,l) - R(k-1,l) - R(k+1,l)| \tag{5}$$

$$V_{k,l} = |2R(k,l) - R(k,l-1) - R(k,l+1)|$$

$$D1_{k,l} = |2R(k,l) - R(k-1,l-1) - R(k+1,l+1)|$$

$$D2_{k,l} = |2R(k,l) - R(k-1,l+1) - R(k+1,l-1)|$$

The variables i and j refer to the coordinates of the upper left sample in the 4×4 block. The summations of all calculated horizontal gradients $g_H$, vertical gradients $g_V$, 135 degree gradients $g_{D1}$ and 45 degree gradients $g_{D2}$ are calculated as:

$$g_H = \sum_{k=i-2}^{i+5}\sum_{l=j-2}^{j+5} H_{k,l},\ g_V = \sum_{k=i-2}^{i+5}\sum_{l=j-2}^{j+5} V_{k,l} \tag{6}$$

$$g_{D1} = \sum_{k=i-2}^{i+5}\sum_{l=j-2}^{j+5} D1_{k,l},\ g_{D2} = \sum_{k=i-2}^{i+5}\sum_{l=j-2}^{j+5} D2_{k,l}$$

The ratio of the maximum and the minimum of the horizontal and vertical gradients, denoted by $R_{H,V}$, and the ratio of the maximum and the minimum of the two diagonal gradients, denoted by $R_{D1,D2}$, are calculated as shown below in equation (7).

$$R_{H,V} = \max(g_H, g_V)/\min(g_H, g_V) \tag{7}$$

$$R_{D1,D2} = \max(g_{D1}, g_{D2})/\min(g_{D1}, g_{D2})$$

Then, $R_{H,V}$ and $R_{D1,D2}$, are compared against each other with two thresholds, $t_1=2$ and $t_2=4.5$, to derive the directionality D, as follows:

Step 1: If both $R_{H,V} \le t_1$ and $R_{D1,D2} \le t_1$, D is set to 0 (texture), otherwise continue with Step 2.

Step 2: If $R_{D1,D2} > R_{H,V}$, continue with Step 3, otherwise continue with Step 4.

Step 3: If $R_{D1,D2} \le t_2$, D is set to 1 (weak diagonal), otherwise, D is set to 2 (strong diagonal).

Step 4: If $R_{H,V} \le t_2$, D is set to 3 (weak horizontal/vertical), otherwise, D is set to 4 (strong horizontal/vertical).

The Activity Value A is Calculated as:

$$A = \left(\sum_{k=i-2}^{i+5}\sum_{l=j-2}^{j+5} (V_{k,l} + H_{k,l})\right) \gg (BD-2) \tag{8}$$

A is further mapped to the range of 0 to 4, inclusive, and the quantized value is denoted as Â. Therefore, each 4×4 block is categorized into one of 25 classes (C) as:

$$C = 5D + \hat{A} \tag{9}$$

Figure 5:
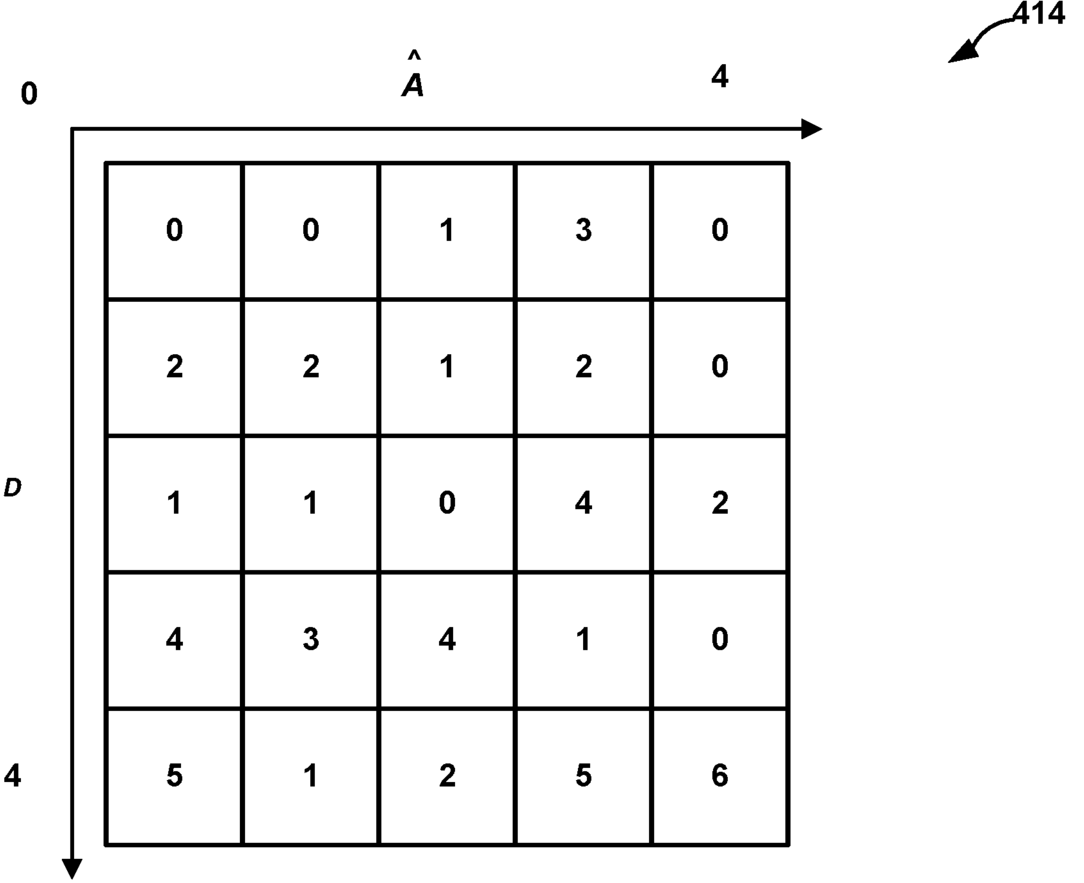
FIG. 5 shows an example of merged classes for ALF signaling.

Therefore, a luma filter set contains 25 filters. However, to reduce the number of bits required to represent the filter coefficients while maintaining the coding efficiency, different classes can be merged. The merged classes use the same filters. Video encoder 200 may signal a merging table. In merging table 414, a filter index of each class is signaled by using a fixed-length code, as is illustrated in FIG. 5, as an example. FIG. 5 shows an example of merging 25 luma classes into 7 merged classes, where each square represents a class (index can be from 0 to 24, inclusive) based on the value of D and Â. In this example filter set, video encoder 200 may be configured to signal 7 luma filters. For each class, video encoder 200 may signal the filter index (from 0 to 6 in this example) in an ALF_APS (adaptation parameter set).

Figure 6:
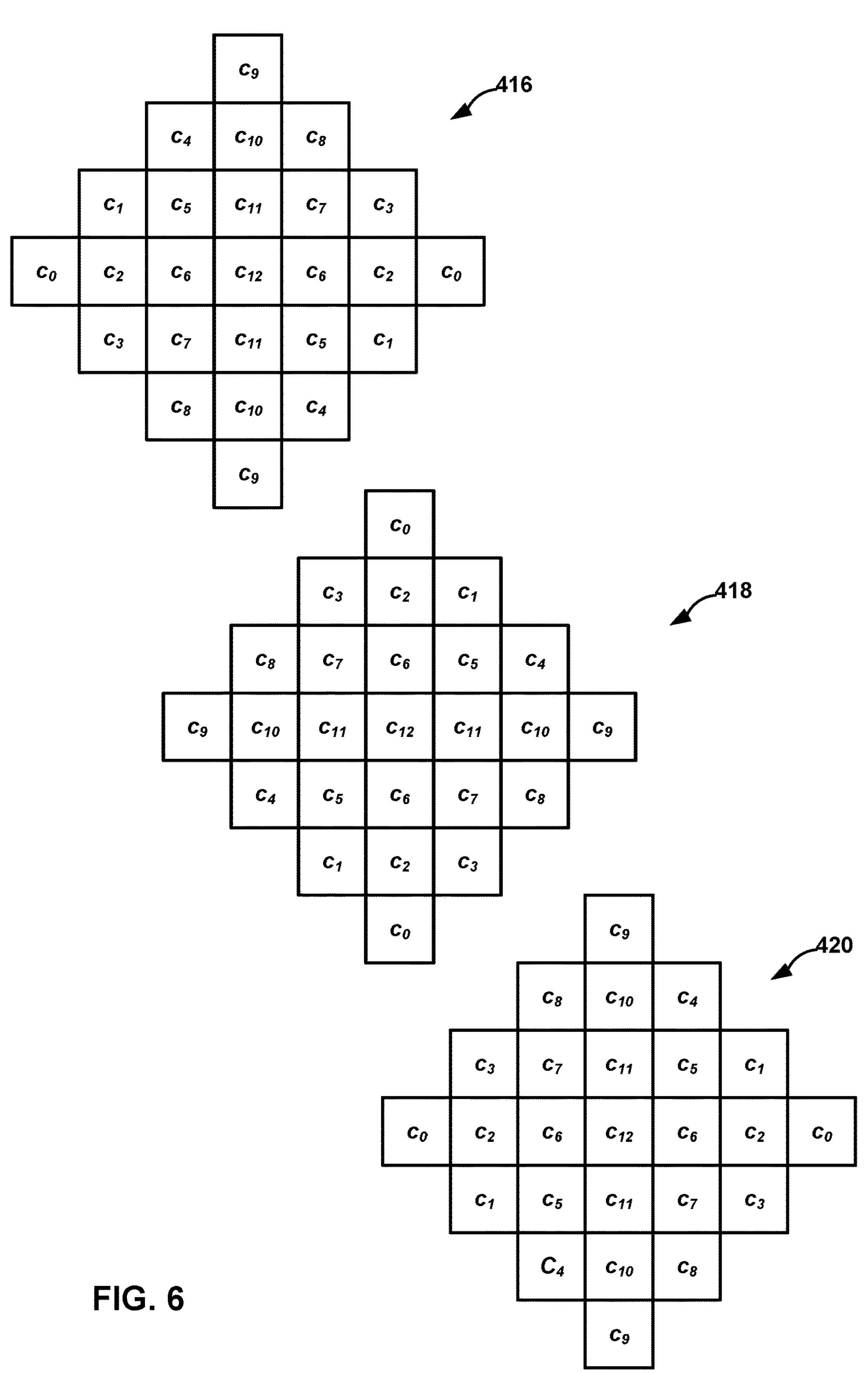
FIG. 6 shows an example of a geometric transformation for a 7×7 diamond filter shape.

Once obtaining a filter from a luma filter set based on class index C of a 4×4 block and the merging table, before obtaining the filter samples of that block, a simple geometric transformation, as illustrated in FIG. 6, can be applied to the filter depending on the gradient values calculated for the 4×4 block as in Table 1.

TABLE 1

Geometric transformation based on gradient values

| Gradient values | Transformation |
|---|---|
| $g_{D2} < g_{D1}$ and $g_H < g_V$ | No transformation |
| $g_{D2} < g_{D1}$ and $g_V \le g_H$ | Diagonal flip |
| $g_{D1} \le g_{D2}$ and $g_H < g_V$ | Vertical flip |
| $g_{D1} \le g_{D2}$ and $g_V \le g_H$ | Right rotation |

FIG. 6 illustrates geometric transformations of a 7×7 diamond filter shape. The geometric transformations include a diagonal flip 416, a vertical flip 418, and a right rotation 420.

Video encoder 200 and video decoder 300 may be configured to perform coding tree block level adaptation. In JEM-7.0, only one luma filter set is applied to all luma CTB s of a slice and only one chroma filter is applied to all chroma CTBs of a slice. However, there are two disadvantages. First, when statistical information among CTBs differs substantially, using the same filter/filter set for all CTB s of a color component may limit the coding efficiency of ALF, especially for large resolution sequences and mixed content video sequences (e.g., both natural content and screen content). Secondly, when deriving a filter for a slice, a filter cannot be calculated until the statistical information of the entire slice is collected. This multiple-pass encoding technique may not be suitable for low-delay applications. To address this problem, one example solution uses statistics from previously coded slices. However, this may cause some performance loss.

In addition to luma 4×4 block level filter adaptation, VVC supports CTB level filter adaption. In a slice, video encoder 200 may be configured to use different luma filter sets for different luma CTBs, and may also use different chroma filters for different chroma CTBs. Video encoder 200 may use the same filters for CTBs with similar statistics. This CTB level filter adaptation improves coding efficiency, especially for low-delay applications. In addition, VVC version 1 allows video encoder 200 to use filters from previously coded pictures for a CTB. This temporal filter re-usage mechanism can reduce the overhead of filter coefficients. In VVC version 1, up to seven signaled luma filter sets and eight signaled chroma filters can be applied to a slice. When there are not any signaled filters, one of 16 fixed filter sets can be applied to a luma CTB.

When ALF is enabled, the filter set index of either a fixed filter set or a signaled luma filter set is signaled for a luma CTB. The filter index of a signaled chroma filter is signaled for a chroma CTB. By using filters signaled from previously coded pictures, as well as fixed filters, when encoding a current CTU in a low delay application, three CTU-level on/off flags and filter/filter set indices can be decided by only using the statistics information of the current CTU. Therefore, the encoded bitstream of each CTU can be generated on the fly instead of waiting for the availability of the statistics of the whole picture.

Video encoder 200 and video decoder 300 may be configured to implement line buffer reduction. As shown in FIG. 2, in the vertical direction, the filter shapes have 7 taps and 5 taps for luma and chroma components, respectively. As a result, in VVC Test Model 2.0 (VTM-2.0), when decoding a row of CTUs, due to the delay of the deblocking filter and SAO filter, 7 luma lines and ∠ chroma lines of the upper CTU row must be stored in a line buffer for ALF. However, the extra line buffers require large chip areas, especially for high-definition (HD) and ultra-high-definition (UHD) video sequences.

Figure 7A:
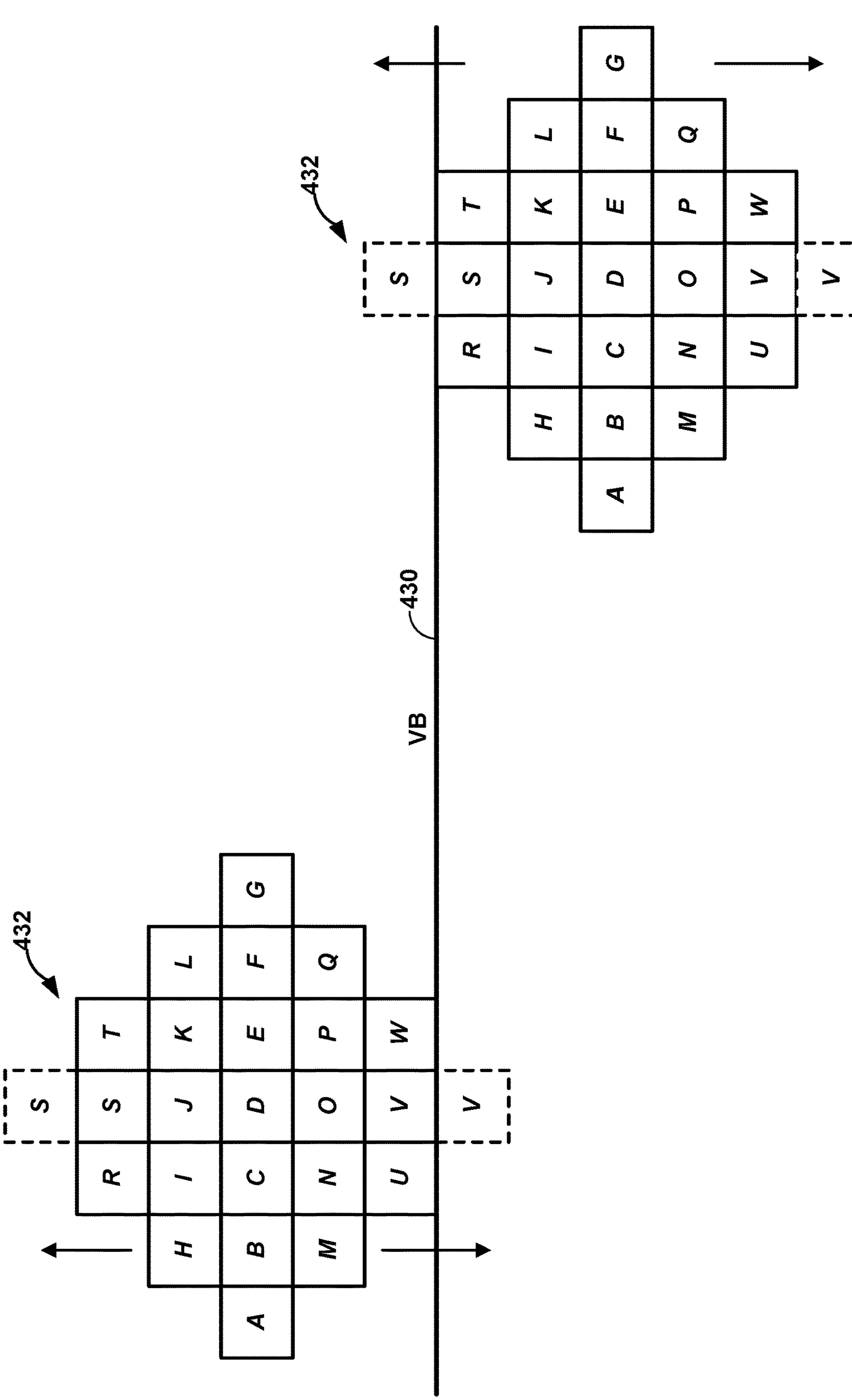
FIGS. 7A-7C show examples of symmetrical sample padding for luma ALF at an ALF virtual boundary.
Figure 7B:
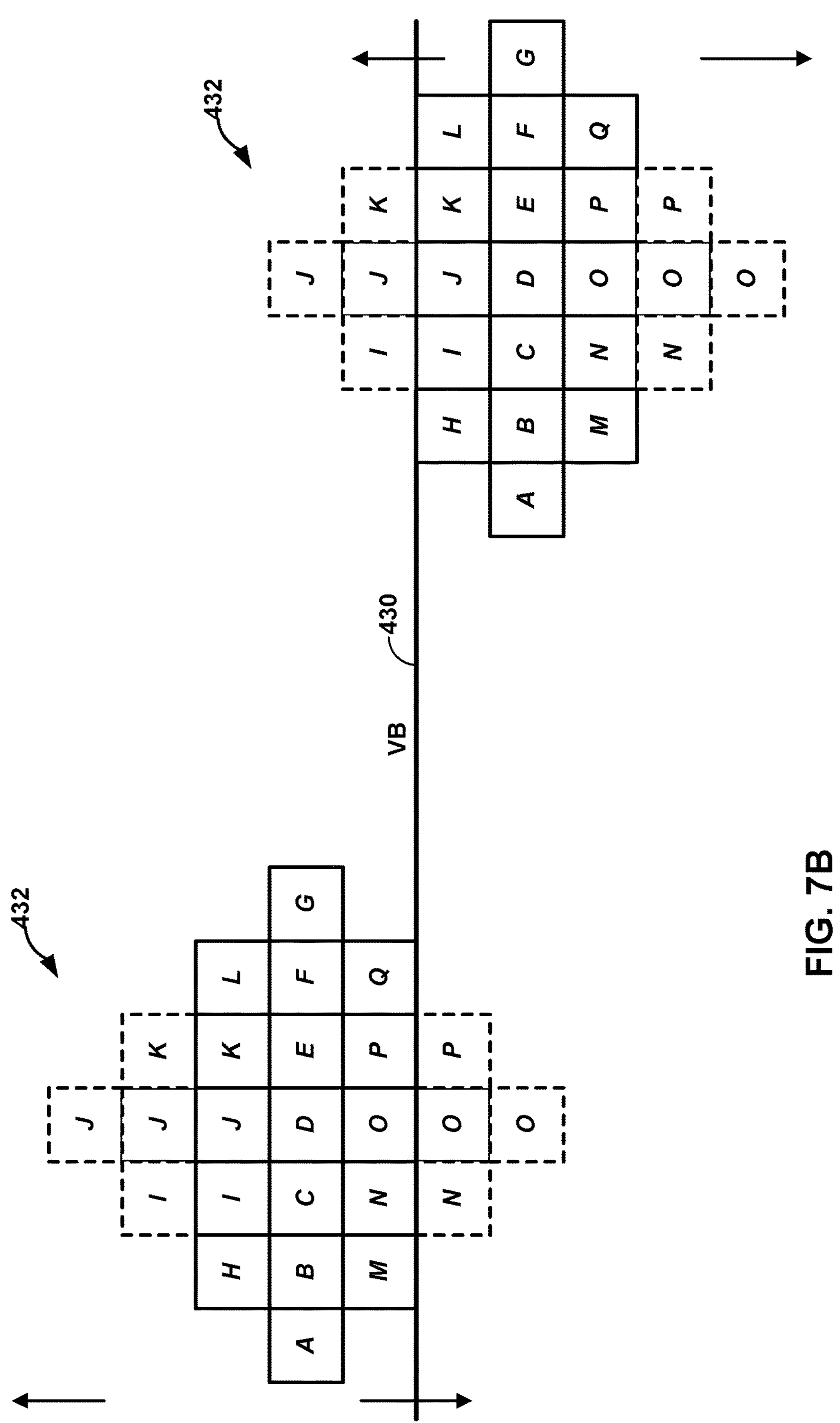
Figure 7C:
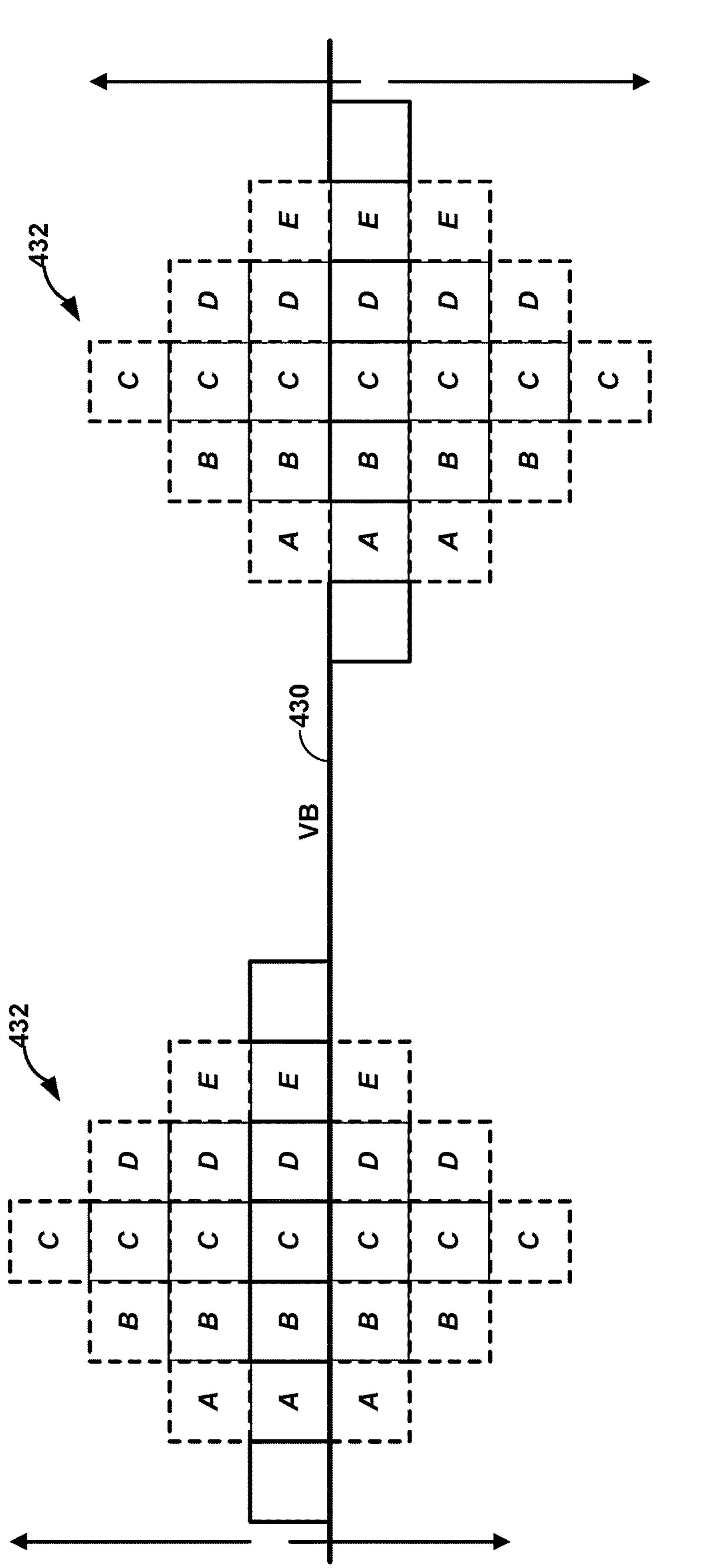

To make ALF hardware friendly (e.g., by reducing line buffer requirements), the concept of a virtual boundary (VB) may be applied to remove all the line buffer overhead for ALF. Considering the deblocking filter and SAO filter in VVC version 1, the position of a VB is 4 luma samples and 2 chroma samples above a horizontal CTU boundary. When one sample on one side of a VB is filtered, the samples on the other side of the VB cannot be utilized. Modified filtering with symmetrical sample padding is applied, as is shown in the examples of FIGS. 7A-7C, where the center square of filter 432 is the position of a current, to-be-filtered sample and the bold line 430 (VB 430) is the position of a VB. In FIGS. 7A-7C the filter tap locations with dashed lines are padded. FIG. 7A shows an example where one filter tap location of filter 432 is above or below VB 430. In this example, one filter tap location is padded. FIG. 7B shows an example where four filter tap locations of filter 432 are above or below VB 430. In this example, four filter tap locations are padded.

However, when a sample is on the closest row on each side of VB 430, e.g., as shown in FIG. 7C, the 2D filter is equivalent to a horizontal filter. This may introduce visual artifacts. To address that problem, the filter strength is compensated when the current, to-be-filtered sample is on the closest row on each side of a VB, as shown in equation (10). Comparing equation (10) with equation (2), 3 more bits are right shifted.

$$\tilde{R}(x, y) = R(x, y) + \left[\sum_{i=0}^{N-2} c_i(f_{i,0} + f_{i,1}) + 512\right] \gg 10 \tag{10}$$

Figure 8:
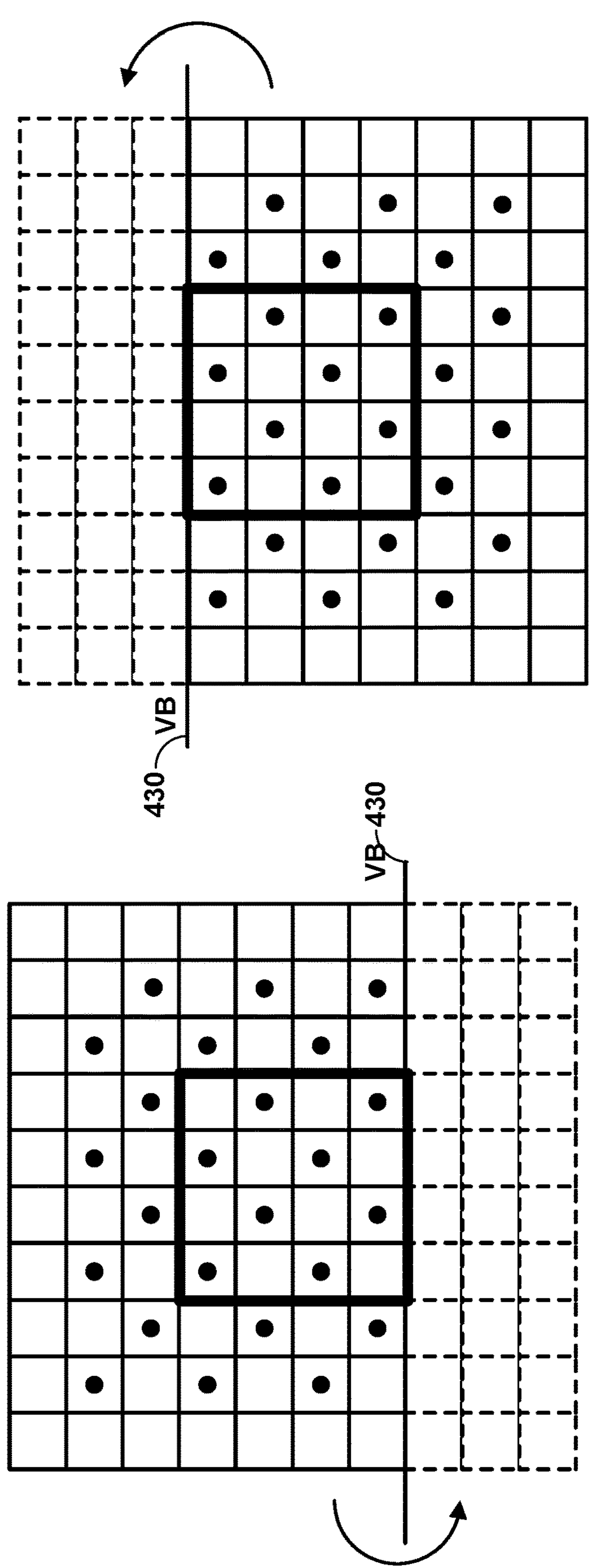
FIG. 8 shows an example of ALF 4×4 sub-block classification at an ALF virtual boundary.

When VB processing is applied, classification of a 4×4 block is also modified. When calculating the class index of a 4×4 block on one side of a VB, the gradients and samples on the other side of the VB are not used, as shown in FIG. 8. However, when calculating gradient values of samples adjacent to a VB, the samples on the other side of the VB cannot be utilized. Therefore, the boundary samples of the current side are repetitively extended, as shown in FIG. 8. That is, the boundary samples on the current side of the VB are mirrored to the other side of the VB. Since the number of available gradient values is reduced, the activity derivation in equation (8) is re-scaled as:

$$A = \left(\sum_{k=i-2}^{i+5} \sum_{l=j-2}^{j+5} (V_{k,l} + H_{k,l}) * 3\right) \gg (BD-1) \tag{11}$$

Video encoder 200 and video decoder 300 may be configured to perform filter coefficient signaling. In VVC version 1, ALF coefficients are signaled in ALF adaptation parameter sets (APS). One APS may contain one set of luma filters with up to 25 filters, up to 8 chroma filters and up to 8 cross-component ALF (CC-ALF) filters. Each set of luma filters support applying ALF to the luma 25 classes. In VVC version 1, up to 8 ALF_APSs are supported.

Table 2 below shows the adaptive loop filter data syntax for VVC.

TABLE 2

| | Descriptor |
|---|---|
| alf_data( ) { | |
| alf_luma_filter_signal_flag | u(1) |
| if( aps_chroma_present_flag ) { | |
| alf_chroma_filter_signal_flag | u(1) |
| alf_cc_cb_filter_signal_flag | u(1) |
| alf_cc_cr_filter_signal_flag | u(1) |
| } | |
| if( alf_luma_filter_signal_flag ) { | |
| alf_luma_clip_flag | u(1) |
| alf_luma_num_filters_signalled_minus1 | ue(v) |
| if( alf_luma_num_filters_signalled_minus1 > 0) | |
| for( filtIdx = 0; filtIdx < NumAlfFilters; filtIdx++ ) | |
| alf_luma_coeff_delta_idx[ filtIdx ] | u(v) |
| for( sfIdx = 0; sfIdx <= alf_luma_num_filters_signalled_minus1; sfIdx++ ) | |
| for( j = 0; j < 12; j++ ) { | |
| alf_luma_coeff_abs[ sfIdx ][ j ] | ue(v) |
| if( alf_luma_coeff_abs[ sfIdx ][ j ] ) | |
| alf_luma_coeff_sign[ sfIdx ][ j ] | u(1) |
| } | |
| if( alf_luma_clip_flag ) | |
| for( sfIdx = 0; sfIdx <= alf_luma_num_filters_signalled_minus1; sfIdx++ ) | |
| for( j = 0; j < 12; j++ ) | |
| alf_luma_clip_idx[ sfIdx ][ j ] | u(2) |
| } | |
| if( alf_chroma_filter_signal_flag ) { | |
| alf_chroma_clip_flag | u(1) |
| alf_chroma_num_alt_filters_minus1 | ue(v) |

TABLE 2-continued

| | Descriptor |
|---|---|
| for( altIdx = 0; altIdx <= alf_chroma_num_alt_filters_minus1; altIdx++ ) { | |
| for( j = 0; j < 6; j++ ) { | |
| alf_chroma_coeff_abs[ altIdx ][ j ] | ue(v) |
| if( alf_chroma_coeff_abs[ altIdx ][ j ] > 0 ) | |
| alf_chroma_coeff_sign[ altIdx ][ j ] | u(1) |
| } | |
| if( alf_chroma_clip_flag ) | |
| for( j = 0; j < 6; j++ ) | |
| alf_chroma_clip_idx[ altIdx ][ j ] | u(2) |
| } | |
| } | |
| if( alf_cc_cb_filter_signal_flag ) { | |
| alf_cc_cb_filters_signalled_minus1 | ue(v) |
| for( k = 0; k < alf_cc_cb_filters_signalled_minus1 + 1; k++ ) { | |
| for( j = 0; j < 7; j++ ) { | |
| alf_cc_cb_mapped_coeff_abs[ k ][ j ] | u(3) |
| if( alf_cc_cb_mapped_coeff_abs[ k ][ j ] ) | |
| alf_cc_cb_coeff_sign[ k ][ j ] | u(1) |
| } | |
| } | |
| } | |
| if( alf_cc_cr_filter_signal_flag ) { | |
| alf_cc_cr_filters_signalled_minus1 | ue(v) |
| for( k = 0; k < alf_cc_cr_filters_signalled_minus1 + 1; k++ ) { | |
| for( j = 0; j < 7; j++ ) { | |
| alf_cc_cr_mapped_coeff_abs[ k ][ j ] | u(3) |
| if( alf_cc_cr_mapped_coeff_abs[ k ][ j ] ) | |
| alf_cc_cr_coeff_sign[ k ][ j ] | u(1) |
| } | |
| } | |
| } | |
| } | |

Video encoder 200 and video decoder 300 may be configured to implement ALF with multiple classifiers. In VVC, when filtering a sample, only one classifier and one filter can be applied. To improve ALF' s performance on top of VVC, in U.S. Provisional patent application Ser. No. 17/557,706, filed Dec. 21, 2021 and incorporated herein by reference, an ALF framework based on multiple classifier was described.

Figure 9:
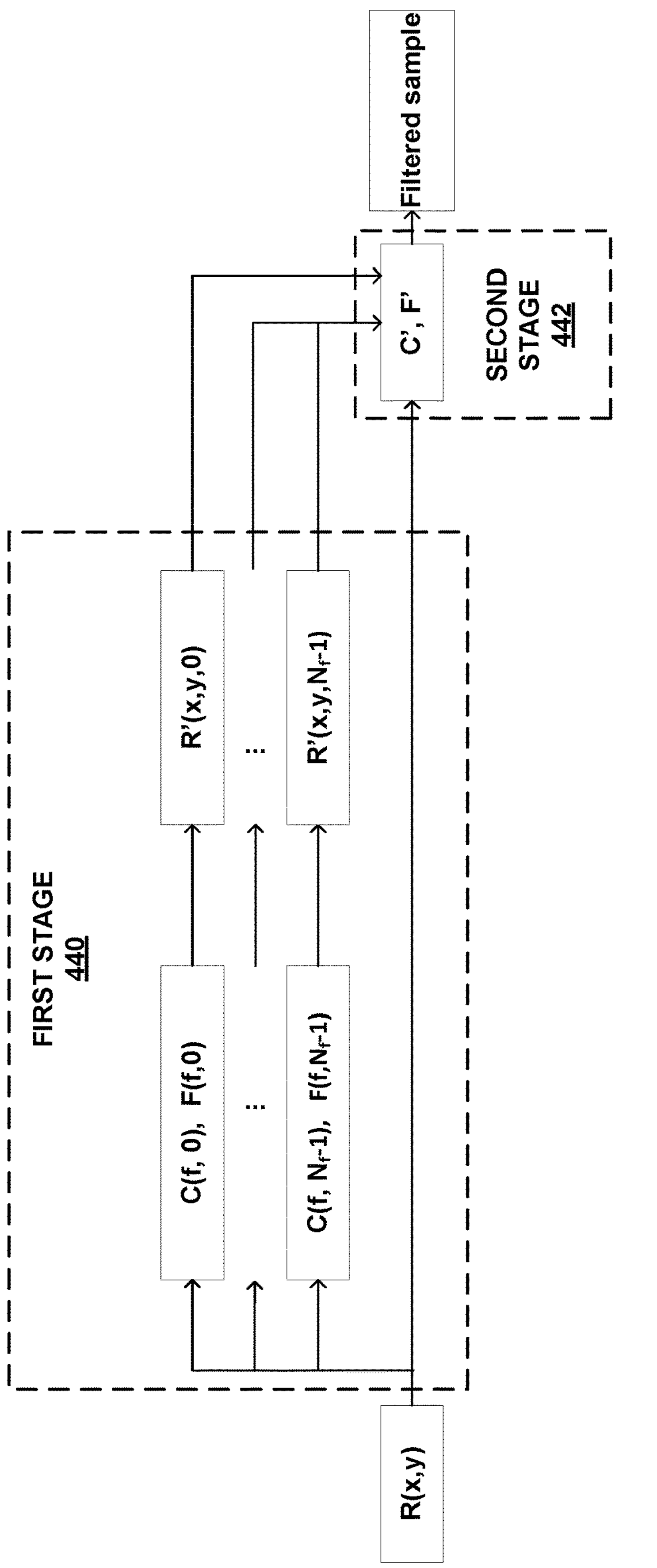
FIGS. 9-12 show example implementations of ALF.

FIG. 9 shows an example of ALF with multiple Laplacian classifiers. In the example of FIG. 9, video encoder 200 and video decoder 300 apply first stage ALF 440 to reconstructed sample R(x,y) of a reconstructed block. To apply first stage ALF 440, video encoder 200 and video decoder 300 applies a classifier (C) to determine a first class index for the reconstructed sample and selects a filter (f) from a first set of filters (F) based on the first class index. Video encoder 200 and video decoder 300 applies the filter from the first set of filters to the reconstructed sample to determine a first intermediate sample value (R'). As shown in FIG. 9, in first stage 440, video encoder 200 and video decoder 300 may use multiple classifiers and multiple filters to determine multiple intermediate sample values.

Video encoder 200 and video decoder 300 apply second stage ALF 442 to the reconstructed sample. Equation (19) below shows an example of how video encoder 200 and video decoder 300 may apply the second stage ALF.

$N_f$ denotes numbers of fixed (pre-defined) filter sets, that may be applied to a sample. Rs are the input to ALF. F(f, i) with i=0 . . . $N_f$−1 denotes the ith fixed filter set. C(f,i) with i=0 . . . $N_f$−1 denotes the classifier with ith fixed filter set. Through C(f, i), for each sample, the filter index is calculated. Based on the filter index, a filter from the fixed filter set F(f, i) is chosen to filter that sample. In addition, C(f, i) determines how to apply the geometric transformation to the coefficients.

Figure 10:
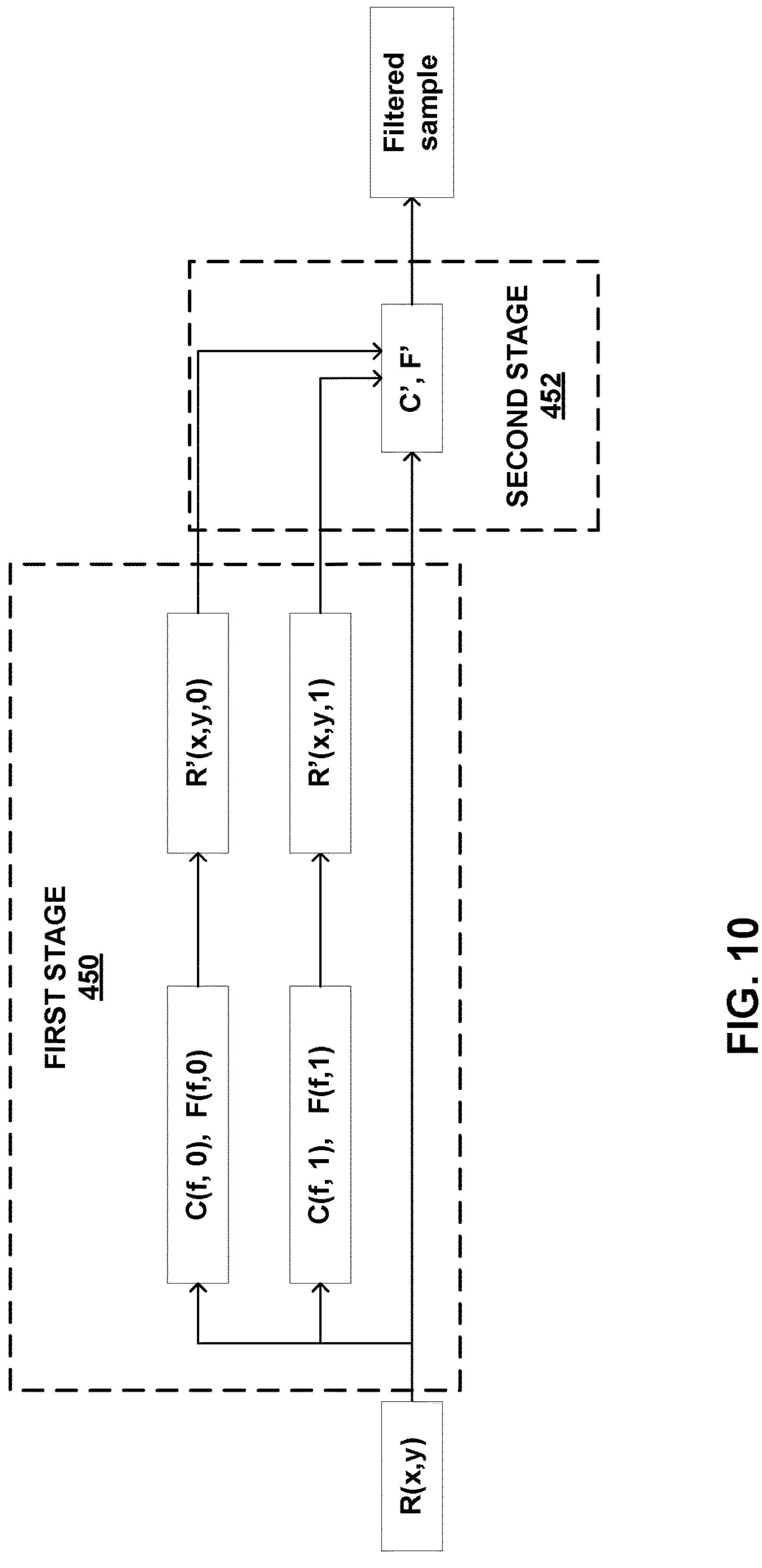

FIG. 10 shows an example of ALF with three classifiers, as proposed in JVET-U0100 (21st Meeting, by teleconference, 6-15 Jan. 2021). In JVET-U0100, which is adopted in ECM-1.0, an ALF framework with Nf=2 is proposed as shown in FIG. 10. In ECM-1.0, in a classifier C(f, i) with i=0 or 1, activity and direction values may be determined based on 2-D Laplacian values. The classifier may be applied to each sample or a block. When a classifier is applied to a block, all samples in the block have the same class index and the same transpose type. The labels wi and hi can denote the width of a block and the height of a block, respectively, and (x, y) can denote the coordinates of the top-left sample of the block.

In the example of FIG. 10, video encoder 200 and video decoder 300 apply first stage ALF 450 to reconstructed sample R(x,y) of a reconstructed block. To apply first stage ALF 450, video encoder 200 and video decoder 300 applies a classifier (C) to determine a first class index for the reconstructed sample and selects a filter (f) from a first set of filters (F) based on the first class index. Video encoder 200 and video decoder 300 apply the filter from the first set of filters to the reconstructed sample to determine a first intermediate sample value (R').

Video encoder 200 and video decoder 300 apply second stage ALF 452 to the reconstructed sample. Equation (19) below shows an example of how video encoder 200 and video decoder 300 may apply the second stage ALF.

The example of FIG. 10 utilizes three Laplacian classifiers, two in first stage 450 and one in second stage 452. As will be explained in more details below, according to the techniques of this disclosure, different types of classifiers, other than just Laplacian classifiers, may be used. For example, according to one implementation, different types of classifiers, such as a band-based classifier, may be used at second stage 452.

For a sample with coordinates (k, l), four Laplacian (gradient) values: horizontal gradient H, vertical gradient V, 135-degree gradient D1 and 45-degree gradient D2 may derived as:

$$H_{k,l} = |2R(k, l) - R(k-1, l) - R(k+1, l)| \tag{12}$$

$$V_{k,l} = |2R(k, l) - R(k, l-1) - R(k, l+1)|$$

$$D1_{k,l} = |2R(k, l) - R(k-1, l-1) - R(k+1, l+1)|$$

$$D2_{k,l} = |2R(k, l) - R(k-1, l+1) - R(k+1, l-1)|$$

As with VVC, video encoder 200 and video decoder 300 may be configured to derive the activity value $A_i$ by using vertical and horizontal gradients as:

$$A_i = \left( \sum_{k=x-a_i}^{x+w_i+a_i-1} \sum_{l=y-b_i}^{y+h_i+b_i-1} (V_{k,l} + H_{k,l}) \right) \tag{13}$$

where $a_i$ and $b_i$ are the window sizes in horizontal and vertical directions for classifier C(f, i), respectively.

$A_i$ is further quantized to the range of 0 to $M_{A,i}-1$ inclusively, and the quantized value is denoted as $\hat{A}_i$.

In one example, $$M_{A,i} = 16,\ A_i = \min(192, (mult_i \cdot A_i) \gg (9 + \text{bitdepth}))$$

$$\text{and } A_i = Q[A_i],$$

where

Q[193]={0,1,2,3,4,4,5,5,6,6,6,6,7,7,7,7,8,8,8,8,8,8,8, 8,9,9,9,9,9,9,9,9,10,10,10,10,10,10,10,10,10,10, 10,10,10,10,10, 11,11,11,11,11,11,11,11,11,11, 11,11,11,11,11,11,12,12,12,12,12,12, 12,12,12, 12,12,12,12,12,12,12,12,12,12,12,12,12,12,12, 12,12,12,12,12, 12,12,12,13,13,13,13,13,13,13, 13,13,13,13,13,13,13,13,13,13,13,13,13, 13,13, 13,13,13,13,13,13,13,13,13,13,14,14,14,14,14, 14,14,14,14,14,14, 14,14,14,14,14,14,14,14,14, 14,14,14,14,14,14,14,14,14,14,14,14,14,14, 14,14,14,14,14,14,14,14,14,14,14,14,14,14,14, 14,14,14,14,14,14,14,14, 14,14,14,14,14,14,14, 15};

bitdepth is the bit depth of R(x, y), $mult_i$ is dependent on the window size ($a_i$, $b_i$) and $mult_i$ is equal to the following values:

| $a_i$ | $b_i$ | $mult_i$ |
|---|---|---|
| 0 | 0 | 5628 |
| 1 | 1 | 1407 |
| 2 | 2 | 624 |
| 3 | 3 | 351 |
| 4 | 4 | 225 |
| 5 | 5 | 156 |

Video encoder 200 and video decoder 300 may be configured to calculate direction by using horizontal gradient H, vertical gradient V, 135-degree gradient D1 and 45-degree gradient D2.

Video encoder 200 and video decoder 300 may be configured to calculate, at first, values of horizontal gradient $g_{i,H}$, vertical gradient $g_{i,V}$, and two diagonal gradients, $g_{i,D1}$ and $g_{i,D2}$, as follows:

$$g_{i,H} = \sum_{k=x-a_i}^{x+w_i+a_i-1} \sum_{l=y-b_i}^{y+h_i+b_i-1} H_{k,l}, \tag{14}$$

$$g_{i,V} = \sum_{k=x-a_i}^{x+w_i+a_i-1} \sum_{l=y-b_i}^{y+h_i+b_i-1} V_{k,l},$$

$$g_{i,D1} = \sum_{k=x-a_i}^{x+w_i+a_i-1} \sum_{l=y-b_i}^{y+h_i+b_i-1} D1_{k,l},$$

$$g_{i,D2} = \sum_{k=x-a_i}^{x+w_i+a_i-1} \sum_{l=y-b_i}^{y+h_i+b_i-1} D2_{k,l},$$

To assign the directionality $D_i$, the maximum and minimum of the horizontal and vertical gradients, video encoder 200 and video decoder 300 may be configured to derive the maximum and minimum of the two diagonal gradients as follows:

$$g_{i,h,v}^{max} = \max(g_{i,H}, g_{i,V}),\ g_{i,h,v}^{min} = \min(g_{i,H}, g_{i,V}) \tag{15}$$

$$g_{i,D1,D2}^{max} = \max(g_{i,D1}, g_{i,D2}),\ g_{i,D1,D2}^{min} = \min(g_{i,D1}, g_{i,D2})$$

Video encoder 200 and video decoder 300 may be configured to calculate edge strengths of horizontal/vertical directions ($ES_{i,HV}$) by comparing the ratio $$g_{i,h,v}^{max} / g_{i,h,v}^{min}$$

to an array of thresholds (Th). The size of the array of thresholds can be represented as S, and the thresholds are sorted ascendingly. The number of directions is $M_{D,i}$=(S+1)*(S+2)

Step 1. Initialize m=0 and $ES_{i,HV}$=0;

Step 2. If m is equal to S, stop; otherwise, go to Step 3.

Step 3. if $$g_{i,h,v}^{max} / g_{i,h,v}^{min} > Th[m],$$

m=m+1 and $ES_{i,HV}$=$ES_{i,HV}$+1, go to Step 2; otherwise, stop.

A Diagonal Direction Directions ($E_{i,D}$) is Calculated Similarly as

Step 1. Initialize m=0 and $E_{i,D}$=0;

Step 2. If m is equal to S, stop; otherwise, go to Step 3.

Step 3. if $$g_{i,D1,D2}^{max} / g_{i,D1,D2}^{min} > Th[m],\ m = m + 1$$

and $E_{i,D}$=$ES_{i,D}$+1, go to Step 2; otherwise, stop.

An example of the array of thresholds is Th=[1.25, 1.5, 2, 3, 4.5, 8] and S=6.

Video encoder 200 and video decoder 300 may be configured to determine a major edge strength ($ES_M$) and a secondary edge strength (ESs) as follows:

If $$g_{i,h,v}^{max} / g_{i,h,v}^{min} > g_{i,D1,D2}^{max} / g_{i,D1,D2}^{min},$$

$ES_M$ is set as $ES_{HV}$ and $ES_S$ is set as $ES_D$; otherwise, $ES_M$ is set as $ES_D$ and $ES_S$ is set as $ES_{HV}$ If $ES_S$ is larger than $ES_M$, $D_i$ is set to 0. Otherwise, if $$g_{i,h,v}^{max}/g_{i,h,v}^{min} > g_{i,D1,D2}^{max}/g_{i,D1,D2}^{min},\ D_i = ES_M*(ES_M+1)/2+ES_S;$$

else, $D_i=ES_M*(ES_M+1)/2+ES_S+M_{D,i}/2$

Class index $C_i$ may be derived as $C_i=\hat{A}_i*M_{D,i}+D_i$

Based on $C_i$, a filter from C(f, i) is picked.

In the second stage, F' is a signaled filter or a predefined filter set and C' is the corresponding classifier. The intermediate filtered results may be further filtered with current sample and/or its neighbors. C' may be used to determine which filter in F' is applied and how to transpose the coefficients.

C' may use the R and/or R' to determine the filter index for filter set F' by calculating activity and directions as the first stage. Transpose may be applied when applying F'.

In one example, for a sample with coordinates (k, l), video encoder 200 and video decoder 300 may be configured to derive four Laplacian (gradient) values, horizontal gradient H, vertical gradient V, 135-degree gradient D1, and 45-degree gradient D2, as:

$$H_{k,l}=|2R(k,l)-R(k-L,l)-R(k+1,l)| \tag{16}$$

$$V_{k,l}=|2R(k,l)-R(k,l-1)-R(k,l+1)|$$

$$D1_{k,l}=|2R(k,l)-R(k-1,l-1)-R(k+1,l+1)|$$

$$D2_{k,l}=|2R(k,l)-R(k-1,l+1)-R(k+1,l-1)|$$

As with VVC, video encoder 200 and video decoder 300 may be configured to derive the activity value A by using vertical and horizontal gradients as follows:

$$A=\left(\sum_{k=x-a}^{x+w+a-1}\sum_{l=y-b}^{y+h+b-1}(V_{k,l}+H_{k,l})\right) \tag{17}$$

where a and b are the window sizes in horizontal and vertical directions for classifier C' respectively and w and h are the width and height of a block where all samples have the same classification index and the same transpose index.

Video encoder 200 and video decoder 300 may be configured to quantize A to the range of 0 to $M_A-1$ inclusive. The quantized value can be denoted as Â. For example, $$Q=\{0,1,2,2,2,2,2,3,3,3,3,3,3,3,3,4\} \tag{18}$$

bitdepth is the bit depth of R(x, y), mult may be dependent on the window size a*b and mult may be equal to the following values:

| a | b | mult |
|---|---|---|
| 0 | 0 | 5628 |
| 1 | 1 | 1407 |
| 2 | 2 | 624 |
| 3 | 3 | 351 |
| 4 | 4 | 225 |
| 5 | 5 | 156 |

After getting the class index of a sample from C', video encoder 200 and video decoder 300 may be configured to select a filter from the filter set F' based on the class index. Video encoder 200 and video decoder 300 may be configured to apply the filtering as:

$$\tilde{R}(x,y)=R(x,y)+\left[\sum_{i=0}^{N_0-2}c_i(f_{i,0}+f_{i,1})\right]+\left[\sum_{i=N_0}^{N_0+N_1-1}c_ig_i\right] \tag{19}$$

In the Above Equation, the Filtering is Separated into 2 Parts:

Filter part 1:

$$\left[\sum_{i=0}^{N_0-2}c_i(f_{i,0}+f_{i,1})\right]:$$

filtering by using neighbouring samples, geometric transformation may be applied. $N_0$ is the number of coefficients. It may be 5×5, 7×7, 9×9, 11×11 or 13×13 diamond filter as shown in FIG. 9.

Filter part 2:

$$\left[\sum_{i=N_0}^{N_0+N_1-1}c_ig_i\right]:$$

filtering by using intermediately filtered samples, geometric transformation may be applied. $N_1$ is the number of coefficients.

The function $f_{i,j}$ with j=0 or 1 may be defined with clipping functions as $$f_{i,j}=f_{i,j}(R(x+x_{i,j},y+y_{i,j}), \tag{20}$$

$$R(x,y))=\min(b_i,\max(-b_i,R(x+x_{i,j},y+y_{i,j})-R(x,y)))$$

The function $g_i$ may be defined with clipping functions as $$\begin{aligned} g_i &= g_i(R'(x,y,i-N_0),R(x,y)) \\ &= \min(b_i,\max(-b_i,R'(x,y,i-N_0)-R(x,y))) \end{aligned} \tag{21}$$

$b_i$ is the clipping parameter corresponding to coefficient $c_i$.

In ECM-1.0, $N_1$=2.

Video encoder 200 and video decoder 300 may be configured to utilize signaled adaptive loop filters with multiple classifiers.

In ECM-1.0, C' is a Laplacian-based classifier. To improve the performance of ALF, a multiple-classifier based ALF was proposed in U.S. patent application Ser. No. 17/853,274 filed Jun. 29, 2022, which is incorporated herein by reference. The band-based classifier, as shown in FIG. 11, is adopted in ECM-3.0.

Figure 11:
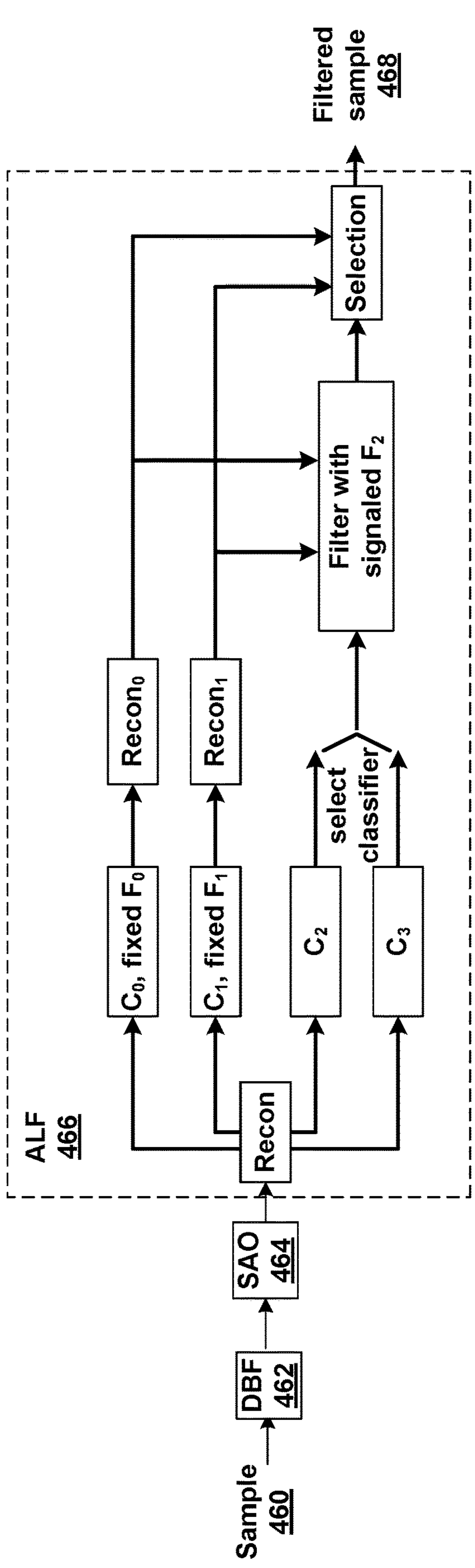

In the example of FIG. 11, sample 460 is first filtered by DBF 462, then SAO 464, and then ALF 466 to produce filtered sample 468. ALF 466 illustrates ALF as implemented in ECM-4.0. In ALF 466 of FIG. 11, when a signaled filter is used to filter the sample, a classifier is selected between C2 and C3 based on a signaled flag. The class index is used to select the filter F2 from a set of signaled filters. C2 is the Laplacian based classifier that is used in ECM-1.0. C3 is the band-based classifier. Like C2, C3 is applied to each non-overlapped 2×2 luma block, the class index is determined as $$(\text{sum} * \text{num\_classes}) \gg (2 + \text{bit\_depth}),$$

where sum is the sum of the luma sample values of the 2×2 luma block, num_classes is equal to 25 and bit_depth is the bit depth of a luma sample.

Figure 12:
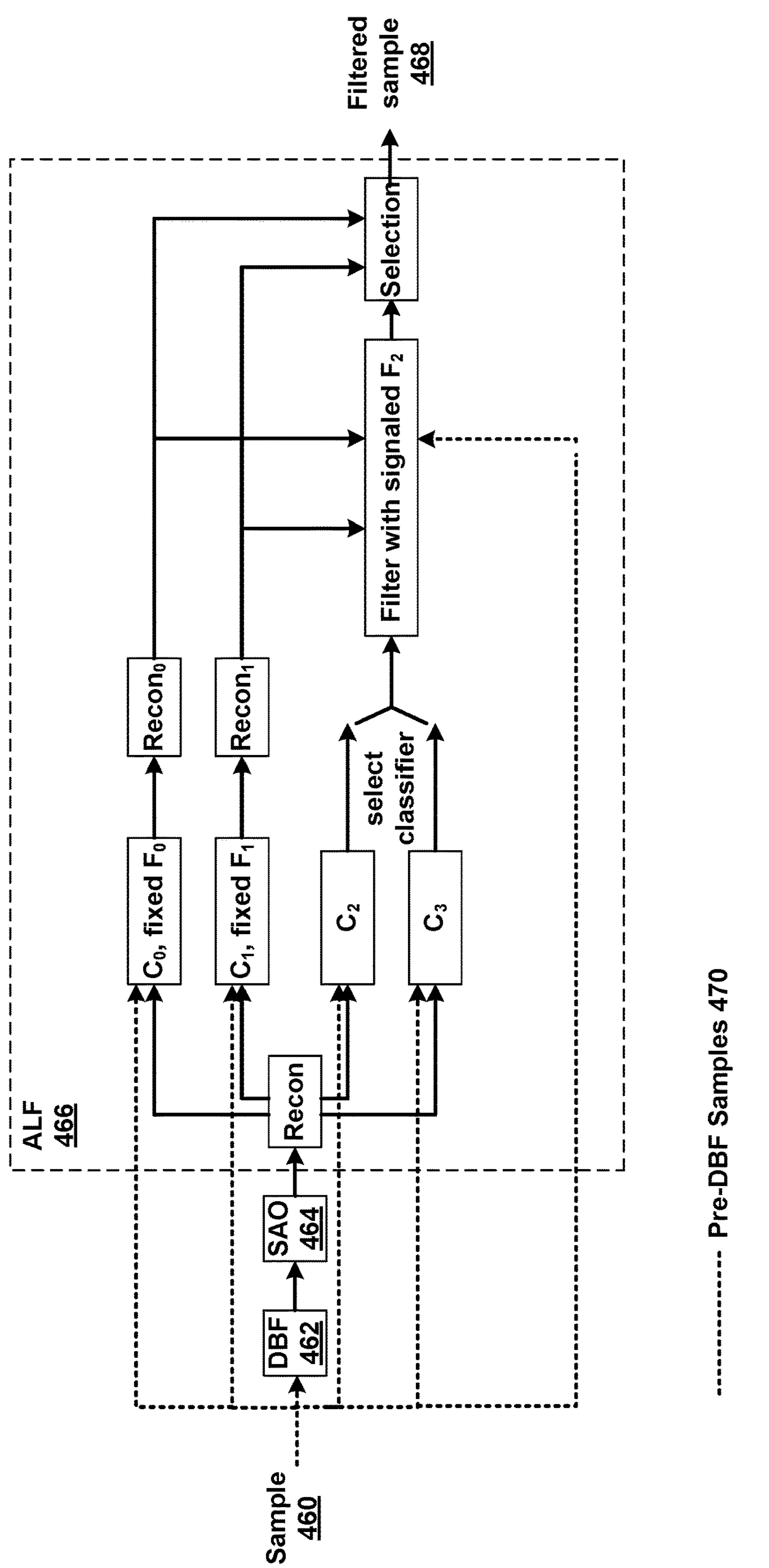

FIG. 12 shows an example of using samples before DBF for ALF. To further improve the performance, in U.S. Patent Provisional Application 63/269,207 (filed Mar. 11, 2022) and JVET-Z0146, both incorporated herein by reference, described techniques for using samples before deblocking filter (DBF) with ALF. As with FIG. 11, in FIG. 12 sample 460 is first filtered by DBF 462, then SAO 464, and then ALF 466 to produce filtered sample 468. In FIG. 12, however, various aspects of filter selection and classification within ALF 466 rely on pre-DBF samples 470, which requires storing pre-DBF samples 470 for use by ALF 466.

When samples before DBF and samples before SAO are used for ALF filtering, eq. (19) is re-written as $$\tilde{R}(x, y) = R(x, y) + \left[\sum_{i=0}^{N_0-2} c_i(f_{i,0} + f_{i,1})\right] + \left[\sum_{i=N_0}^{N_0+N_d-1} c_i d_i\right] + \left[\sum_{i=N_0+N_d}^{N_0+N_d+N_1-1} c_i g_i\right] \quad (22)$$

The function $d_i$ may be defined with clipping functions as $$\begin{aligned} d_i &= d_i(R_d(x + x_i, y + y_i), R(x, y)) \quad (23) \\ &= \min(b_i, \max(-b_i, R_d(x + x_i, y + y_i) - R(x, y))) \end{aligned}$$

where $R_d(x+x_i, y+y_i)$ is a neighboring sample before DBF and $(x_i, y_i)$ is the coordinate offset that relative to current sample R(x,y), $N_d$ is number of taps that applied to the samples before DBF. In JVET-Z0146, two symmetrical diamond filter shapes are applied to samples before DBF.

Existing implementations of ALF may have some shortcomings, and this disclosure describes techniques that may improve upon those shortcomings. Using samples before DBF can improve coding efficiency. As current implementations of ALF rely on samples between different hardware pipeline stages (e.g., before DBF and before ALF), more line buffer storage are needed for ALF.

This disclosure describes techniques that may reduce the hardware overhead for implementing ALF while maintaining or improving coding efficiency. According to the techniques of this disclosure, it is proposed to apply a filter in parallel with DBF as shown in FIG. 13.

Figure 13:
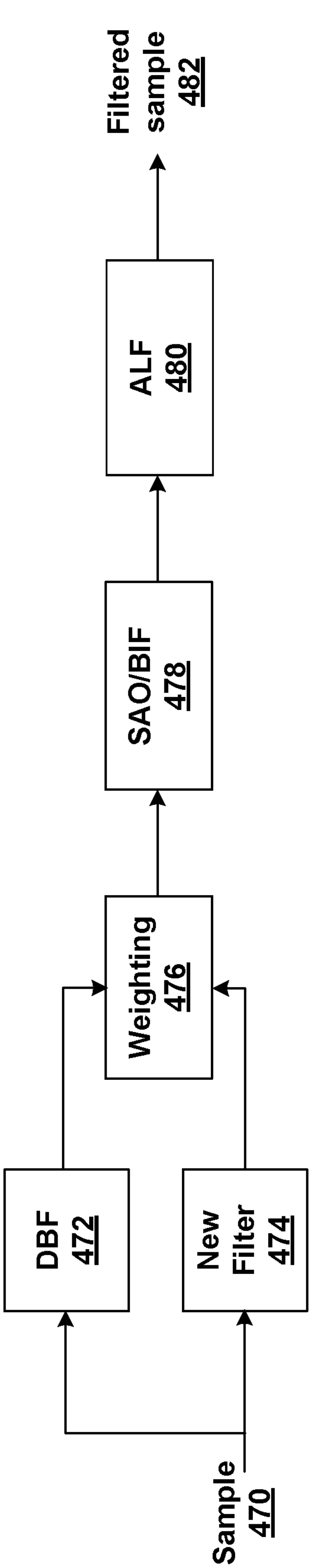
FIG. 13 shows an example implementation of a new filter being applied in parallel with deblocking filtering.

FIG. 13 shows an example of a new filter that may be applied in parallel with DBF to a block of video data. In the example of FIG. 13, video decoder 300 applies DBF 472 to sample 470 to determine a deblocked sample and applies new filter 474 to sample 470, in parallel with DBF 472, to determine a second filtered sample. Video decoder 300 then performs weighting 476 to combine the deblocked sample and the second filtered sample. Video decoder 300 applies a third filter, SAO 478, to the combined sample. Video decoder 300 then applies ALF 480 to the output of SAO 478 to produce filtered sample 482. ALF 480 may, for example, have a similar structure to ALF 466 of FIG. 11 with only the post-SAO samples as inputs. Video decoder 300 outputs filtered sample 482, for example, as part of a decoded version of the block of video data.

FIG. 14 shows an example of proposed filter 490, which is a cross or diamond shape 3×3 filter, and proposed filter 492, which is a 5×5 diamond filter. Filters 490 and 492 are examples of filters that may be used for new filter 474 in FIG. 13.

To implement the techniques of this disclosure, video encoder 200 and video decoder 300 may be configured to implement filtering as follows:

1. The input samples of the new filter may be the same as the input samples of DBF.
2. The new filter may only filter the samples identified by DBF, e.g., samples close to block boundaries. For example, only the samples within a certain distance from a block edge may be filtered. In one example, the block edge may be identified by DBF. In another example, this distance may be 1 sample from an intra 4×4 block and may be 3 samples from other edges. In another example, to filter a sample, the edge strength may exceed or within a threshold.
3. When new filter 474 is applied in parallel with DBF 472, the filtered samples from DBF 472 and the paralleled new filter 474 may be weighted summed to generate the output of this stage. In one example, the weights may be fixed for all samples. In another example, the weights may be signaled at sequence/APS/picture/slice/block/filter and other levels.
4. The on/off flag of this paralleled filter may be signaled at sequence/parameter set/frame/slice/block levels.
5. New filter 474 may be a fixed (pre-trained) filter or a signaled filter. Classification may be applied to determine which filter is applied to a sample.
6. New filter 474 may be an ALF, bilateral filter, guided filter, or any other-type filter.
7. The information from this stage may be applied to the ALF stage (ALF 480 in FIG. 13). For example, the decision to filter a sample in the new filter may be used by a classifier in ALF stage. For example, the final class index in ALF stage may be derived as class_idx+num_classes*i, where class_idx is derived from a classifier in ALF stage, num_classes is the number of classes in this classifier and i (=0 or 1) is the decision to filter a sample by a filter paralleled to DBF.

Figure 15:
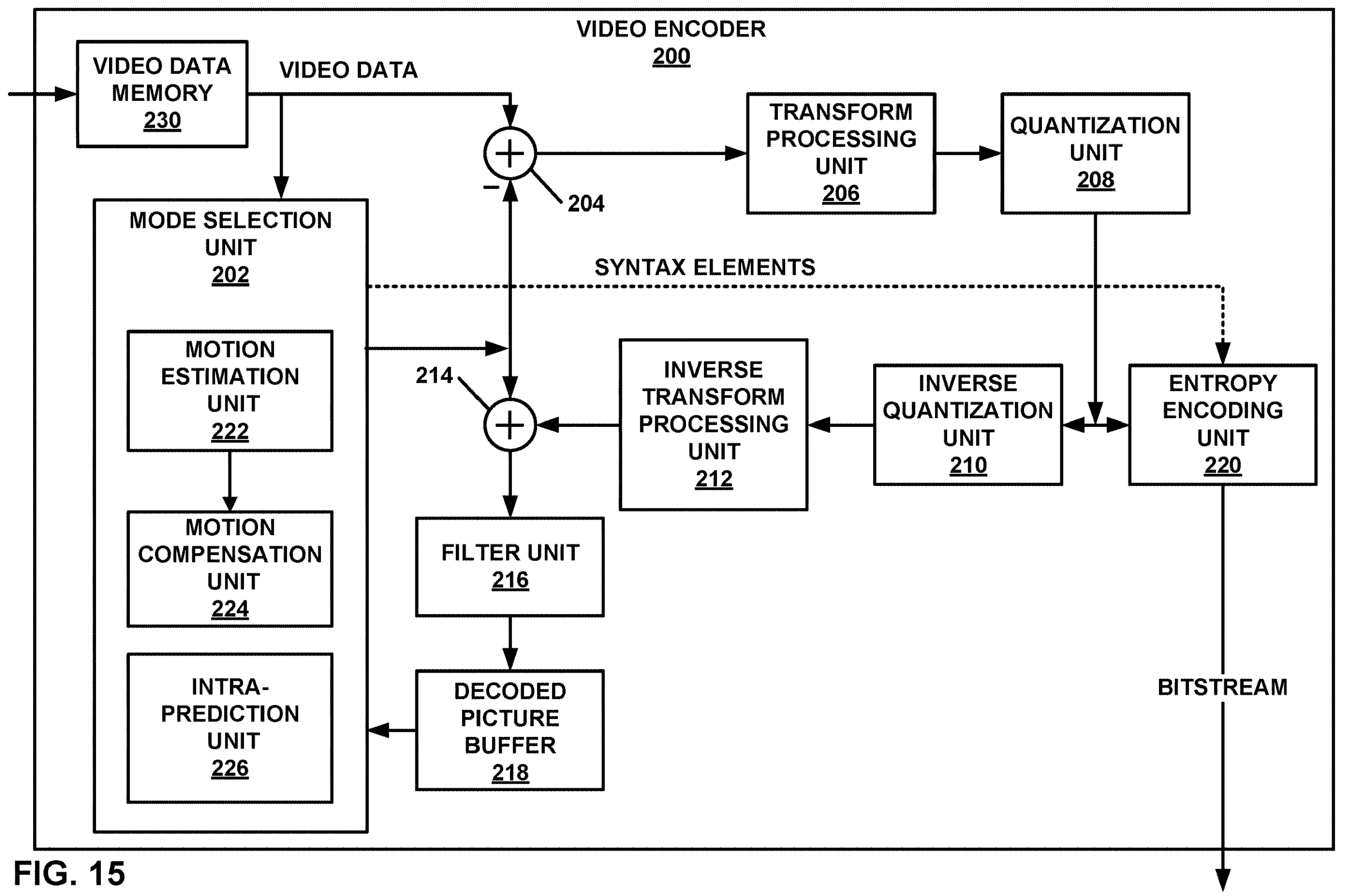
FIG. 15 is a block diagram illustrating an example video encoder that may perform the techniques of this disclosure.

FIG. 15 is a block diagram illustrating an example video encoder 200 that may perform the techniques of this disclosure. FIG. 15 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 15, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in a processing system of one or more processors and/or processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is another example of a memory system that may function as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 15 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to SAD, SSD, MAD, MSD, or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors.

Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Filter unit 216 may also perform the ALF techniques described in this disclosure. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Filter unit 216 may, for example, perform techniques described in this disclosure. Filter unit 216 may, for example, determine, for a current block of video data, a classifier from a plurality of available classifiers for the current block, wherein each classifier of the plurality of available classifiers defines a process for calculating a class index; determine a class index based on the determined classifier and one or more sample values of the current block; select a filter from a set of filters based on the class index; and apply the filter to the current block. Filter unit 216 may apply the two-stage ALF described above using multiple classifiers.

In accordance with the techniques of this disclosure, filter unit 216 may be configured to apply a first filter, such as a deblocking filter, to a block of video data to determine a first filtered block and apply a second filter to the block of video data in parallel with the first filter to determine a second filtered block. Filter unit 216 may then combine the first filtered block and the second filtered block to determine a combined block and apply a third filter to the combined block to determine a third filtered block. Filter unit 216, or other units of video encoder 200, may then process the third filtered block to determine a decoded version of the block of video data and output the decoded version of the block of video data.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 16:
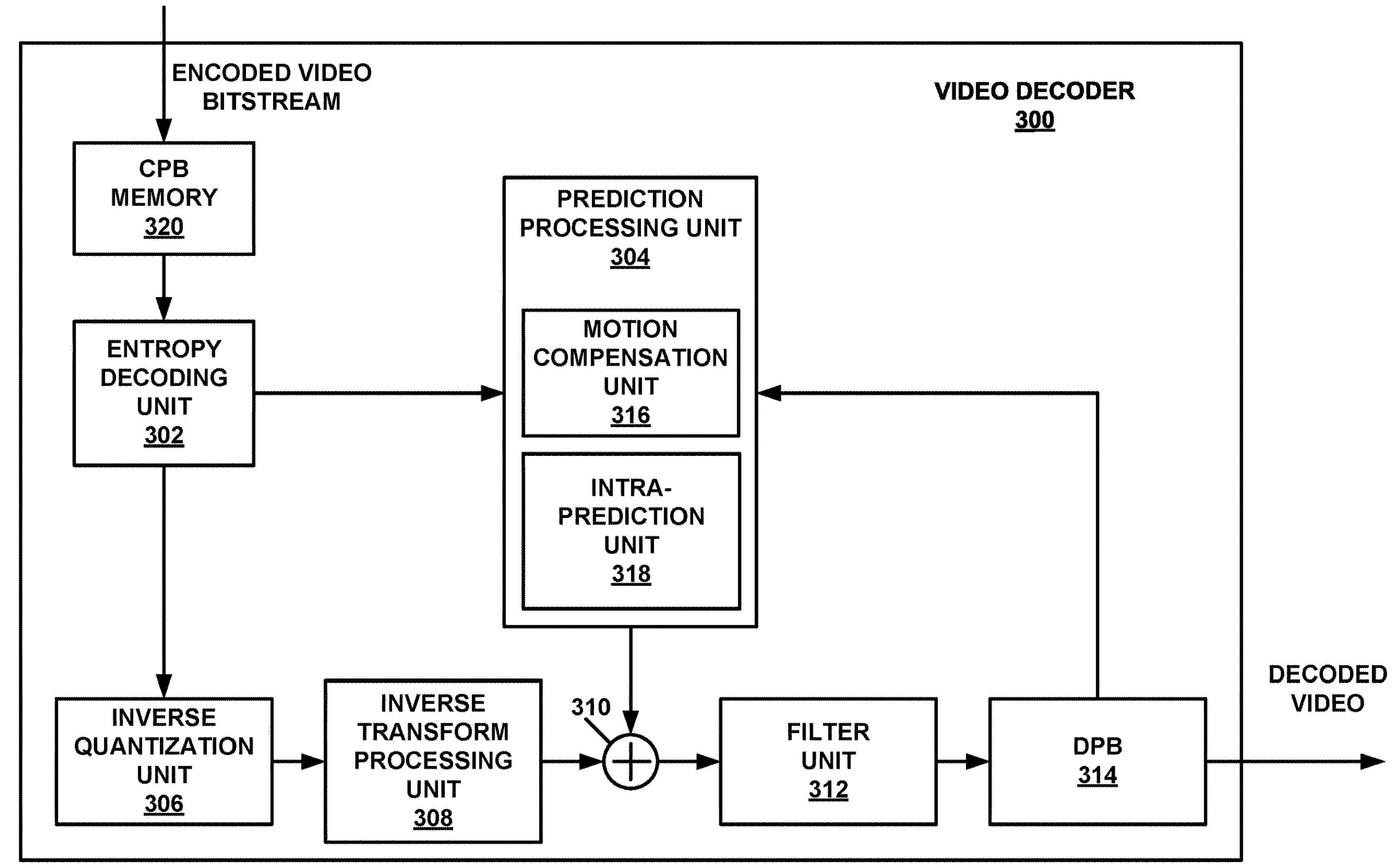
FIG. 16 is a block diagram illustrating an example video decoder that may perform the techniques of this disclosure.

FIG. 16 is a block diagram illustrating an example video decoder 300 that may perform the techniques of this disclosure. FIG. 16 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 16, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in a processing system of one or more processors and/or processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 16 are illustrated to assist with understanding the operations performed by video decoder 300. The units may be implemented as fixed-function circuits, programmable circuits, or a combination thereof. Similar to FIG. 15, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 15).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 15). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Filter unit 312 may also perform the ALF techniques described in this disclosure. Operations of filter unit 312 are not necessarily performed in all examples.

Filter unit 312 may, for example, perform techniques described in this disclosure. Filter unit 312 may, for example, determine, for a current block of video data, a classifier from a plurality of available classifiers for the current block, wherein each classifier of the plurality of available classifiers defines a process for calculating a class index; determine a class index based on the determined classifier and one or more sample values of the current block; select a filter from a set of filters based on the class index; and apply the filter to the current block. Filter unit 312 may apply the two-stage ALF described above using multiple classifiers.

In accordance with the techniques of this disclosure, filter unit 312 may be configured to apply a first filter, such as a deblocking filter, to a block of video data to determine a first filtered block and apply a second filter to the block of video data in parallel with the first filter to determine a second filtered block. Filter unit 312 may then combine the first filtered block and the second filtered block to determine a combined block and apply a third filter to the combined block to determine a third filtered block. Filter unit 312, or other units of video decoder 300, may then process the third filtered block to determine a decoded version of the block of video data and output the decoded version of the block of video data.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 17:
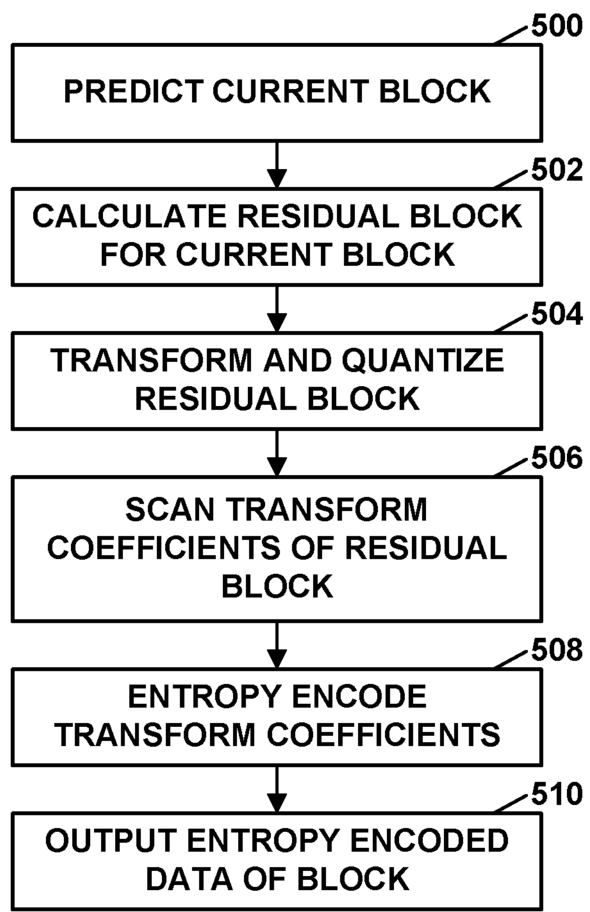
FIG. 17 is a flowchart illustrating an example process for encoding a current block in accordance with the techniques of this disclosure.

FIG. 17 is a flowchart illustrating an example process for encoding a current block in accordance with the techniques of this disclosure. The current block may comprise a current CU. Although described with respect to video encoder 200 (FIGS. 1 and 15), it should be understood that other devices may be configured to perform a process similar to that of FIG. 17.

In this example, video encoder 200 initially predicts the current block (500). For example, video encoder 200 may form a prediction block for the current block. Video encoder 200 may then calculate a residual block for the current block (502). To calculate the residual block, video encoder 200 may calculate a difference between the original, unencoded block and the prediction block for the current block. Video encoder 200 may then transform the residual block and quantize transform coefficients of the residual block (504). Next, video encoder 200 may scan the quantized transform coefficients of the residual block (506). During the scan, or following the scan, video encoder 200 may entropy encode the transform coefficients (508). For example, video encoder 200 may encode the transform coefficients using CAVLC or CABAC. Video encoder 200 may then output the entropy encoded data of the block (510).

Figure 18:
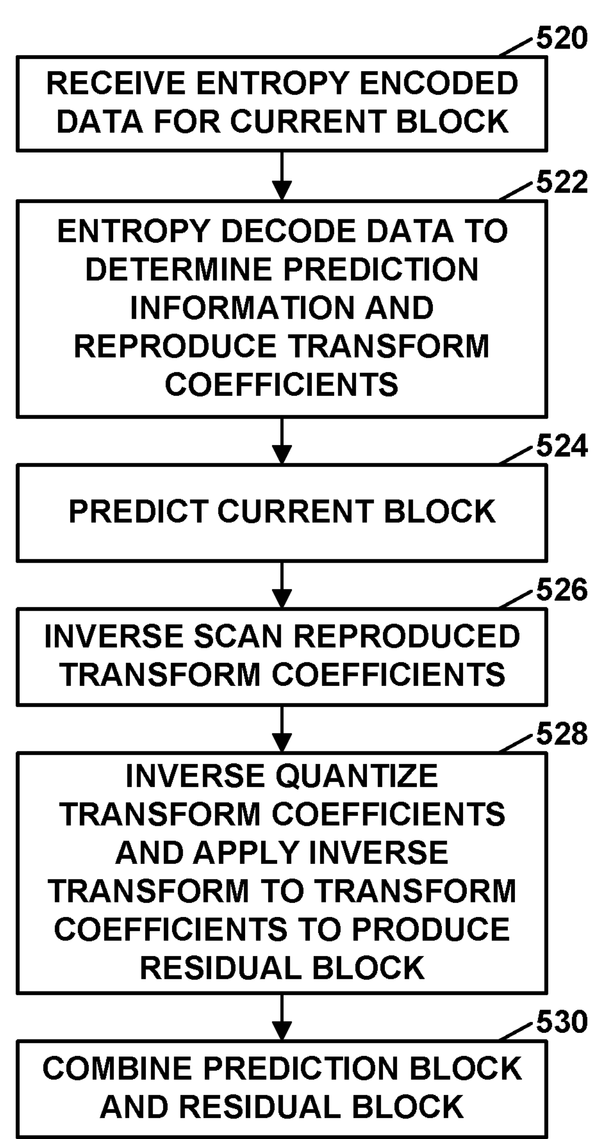
FIG. 18 is a flowchart illustrating an example process for decoding a current block in accordance with the techniques of this disclosure.

FIG. 18 is a flowchart illustrating an example process for decoding a current block of video data in accordance with the techniques of this disclosure. The current block may comprise a current CU. Although described with respect to video decoder 300 (FIGS. 1 and 16), it should be understood that other devices may be configured to perform a process similar to that of FIG. 18.

Video decoder 300 may receive entropy encoded data for the current block, such as entropy encoded prediction information and entropy encoded data for transform coefficients of a residual block corresponding to the current block (520). Video decoder 300 may entropy decode the entropy encoded data to determine prediction information for the current block and to reproduce transform coefficients of the residual block (522). Video decoder 300 may predict the current block (524), e.g., using an intra- or inter-prediction mode as indicated by the prediction information for the current block, to calculate a prediction block for the current block. Video decoder 300 may then inverse scan the reproduced transform coefficients (526), to create a block of quantized transform coefficients. Video decoder 300 may then inverse quantize the transform coefficients and apply an inverse transform to the transform coefficients to produce a residual block (528). Video decoder 300 may ultimately decode the current block by combining the prediction block and the residual block to form a reconstructed block (530). Video decoder 300 may perform the filtering techniques described in this disclosure, including de-block filtering, ALF, and other such filtering, on the reconstructed block.

Figure 19:
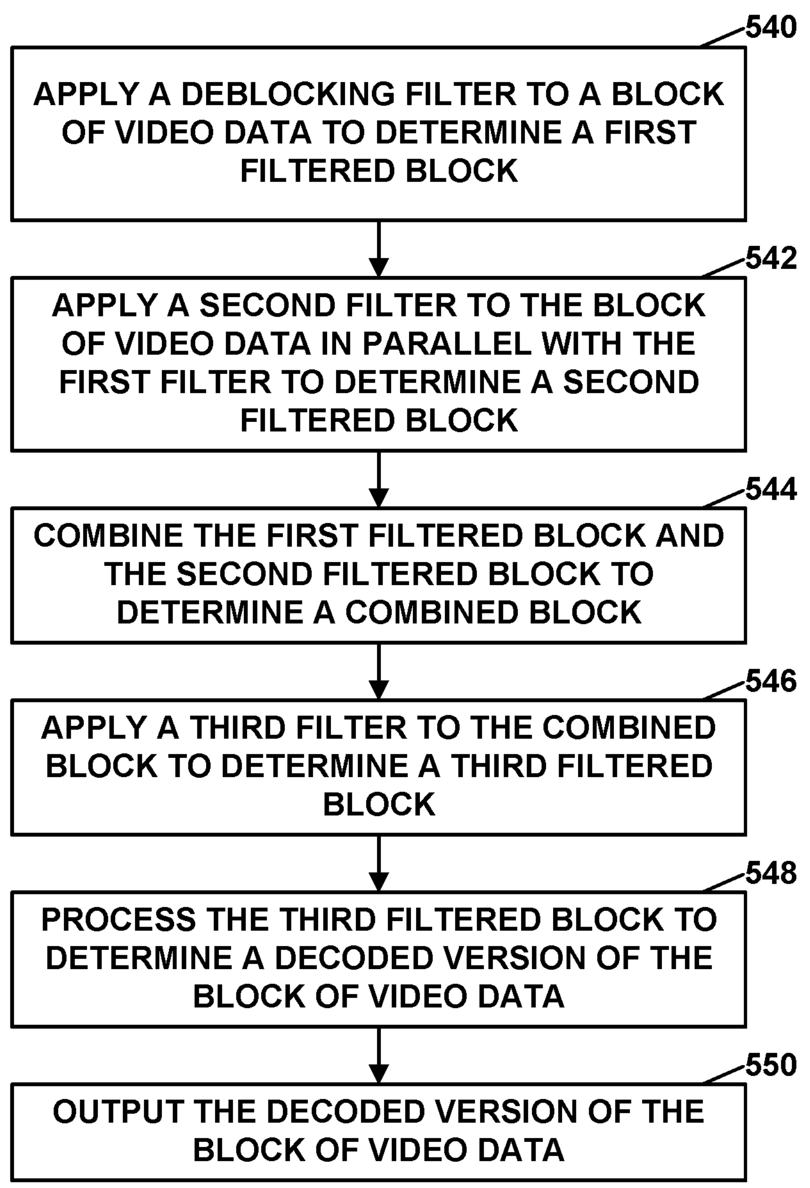
FIG. 19 is a flowchart illustrating an example process for decoding a current block in accordance with the techniques of this disclosure.

FIG. 19 is a flowchart illustrating an example process for decoding a current block of video data in accordance with the techniques of this disclosure. Although described with respect to video decoder 300 (FIGS. 1 and 16), it should be understood that other devices may be configured to perform a process similar to that of FIG. 19. For example, the video decoding loop of video encoder 200, including filter unit 216, may perform some of the techniques of FIG. 20.

In the example of FIG. 19, video decoder 300 applies a first filter to a block of video data to determine a first filtered block (540). The first filter may, for example, be a deblocking filter that removes blockiness artifacts from the boundaries of blocks.

Video decoder 300 applies a second filter to the block of video data in parallel with the first filter to determine a second filtered block (542). The second filter may, for example, be a fixed, non-signaled filter, a signaled filter, or an implicitly determined filter that is determined without explicit signaling. The second filter may, for example, be an ALF, a bilateral filter, a guided filter, or some other such filter.

Video decoder 300 combines the first filtered block and the second filtered block to determine a combined block (544). To combine the first filtered block and the second filtered block to determine the combined block, video decoder 300 may, for example, determine the combined block based on a weighted sum, e.g., weighted average, of samples of the first filtered block and samples of the second filtered block. Video decoder 300 may, for example, receive, in a bitstream that includes the video data, weighting values for determining the weighted sum of the samples of the first filtered block and the samples of the second filtered block. In some examples, the weighting values may be fixed or otherwise determined without explicit signaling.

Video decoder 300 applies a third filter to the combined block to determine a third filtered block (546). The third filter may, for example, be a sample adaptive offset filter, an ALF, or some other type of filter. The first, second, and third filters may, for example, be applied by filter unit 312.

Video decoder 300 processes the third filtered block to determine a decoded version of the block of video data (548). In some examples when the third filter is an SAO filter, then the processing of block 548 may include additional filtering, such as ALF.

Video decoder 300 outputs the decoded version of the block of video data (550). Video decoder 300 may output the decoded version of the block of video data by outputting a decoded picture that includes the decoded version of the block. Video decoder 300 may, for example, store the picture in a decoded picture buffer for use in decoding subsequent pictures, store the decoded picture to a storage medium for later display, or output the decoded picture to a display device for real-time or near real-time display. In instances where the techniques of FIG. 19 are performed by a video encoder, the video encoder may, for example, output the decoded picture by storing the picture in a decoded picture buffer for use in encoding subsequent pictures.

The following numbered clauses illustrate one or more aspects of the devices and techniques described in this disclosure.

Clause 1A: A method of coding, the method comprising: applying a deblocking filter to a block of video data in parallel with another filter; and outputting a filtered version of the block.

Clause 2A: The method of clause 1A, wherein coding comprises decoding.

Clause 3A: The method of clause 1A, wherein coding comprises encoding.

Clause 4A: A device for coding video data, the device comprising one or more means for performing the method of any of clauses 1A-3A.

Clause 5A: The device of clause 4A, wherein the one or more means comprise one or more processors implemented in circuitry.

Clause 6A: The device of any of clauses 4A and 5A, further comprising a memory to store the video data. Clause 7A: The device of any of clauses 4A-6A, further comprising a display configured to display decoded video data.

Clause 8A: The device of any of clauses 4A-7A, wherein the device comprises one or more of a camera, a computer, a mobile device, a broadcast receiver device, or a set-top box.

Clause 9A: The device of any of clauses 4A-8A, wherein the device comprises a video decoder.

Clause 10A: The device of any of clauses 4A-9A, wherein the device comprises a video encoder.

Clause 11A: A computer-readable storage medium having stored thereon instructions that, when executed, cause one or more processors to perform the method of any of clauses 1A-3A.

Clause 12A: A device for encoding video data, the device comprising: means for applying a deblocking filter to a block of video data in parallel with another filter; and means for outputting a filtered version of the block.

Clause 1B: A method for decoding video data, the method comprising: applying a deblocking filter to a block of video data to determine a first filtered block; applying a second filter to the block of video data in parallel with deblocking filter to determine a second filtered block, wherein the second filter comprises one of a guided filter, a bilateral filter, or an adaptive loop filter; combining the first filtered block and the second filtered block to determine a combined block; applying a third filter to the combined block to determine a third filtered block; processing the third filtered block to determine a decoded version of the block of video data; and outputting the decoded version of the block of video data.

Clause 2B: The method of clause 1B, wherein combining the first filtered block and the second filtered block to determine the combined block comprises determining the combined block based on a weighted sum of samples of the first filtered block and samples of the second filtered block.

Clause 3B: The method of clause 2B, further comprising: receiving, in a bitstream comprising the video data, weighting values for determining the weighted sum of the samples of the first filtered block and the samples of the second filtered block.

Clause 4B: The method of clause 1B, wherein the third filter comprises a sample adaptive offset filter.

Clause 5B: The method of clause 1B, wherein processing the third filtered block to determine the decoded version of the block of video data comprises applying a second adaptive loop filter to the third filtered block.

Clause 6B: The method of clause 1B, wherein the second filter comprises a fixed, non-signaled filter.

Clause 7B: The method of clause 1B, wherein the second filter comprises a signaled filter.

Clause 8B: The method of clause 1B, wherein: the third filter comprises a sample adaptive offset (SAO) filter and the third filtered block comprises an SAO-filtered block, processing the third filtered block to determine the decoded version of the block of video data comprises applying a second adaptive loop filter to the SAO-filtered block.

Clause 9B: The method of clause 1B, wherein outputting the decoded version of the block of video data comprises one or more of outputting the decoded version of the block of video data for display or storing the decoded version of the block of video data.

Clause 10B: The method of clause 1B, wherein the method of decoding the video data is performed as part of a video encoding process, and wherein outputting the decoded version of the block of video data comprises storing the decoded version of the block of video data for encoding other blocks of the video data.

Clause 11B: A device for decoding video data, the device comprising: a memory system configured to store video data; and a processing system coupled to the memory system, implemented in circuitry, and configured to: apply a deblocking filter to a block of video data to determine a first filtered block; apply a second filter to the block of video data in parallel with the deblocking filter to determine a second filtered block, wherein the second filter comprises one of a guided filter, a bilateral filter, or an adaptive loop filter; combine the first filtered block and the second filtered block to determine a combined block; apply a third filter to the combined block to determine a third filtered block; process the third filtered block to determine a decoded version of the block of video data; and output the decoded version of the block of video data.

Clause 12B: The device of clause 11B, wherein to combine the first filtered block and the second filtered block to determine the combined block, the processing system is further configured to determine the combined block based on a weighted sum of samples of the first filtered block and samples of the second filtered block.

Clause 13B: The device of clause 12B, wherein the processing system is further configured to: receive, in a bitstream comprising the video data, weighting values for determining the weighted sum of the samples of the first filtered block and the samples of the second filtered block.

Clause 14B: The device of clause 11B, wherein the third filter comprises a sample adaptive offset filter.

Clause 15B: The device of clause 11B, wherein to process the third filtered block to determine the decoded version of the block of video data, the processing system is further configured to apply a second adaptive loop filter to the third filtered block.

Clause 16B: The device of clause 11B, wherein the second filter comprises a fixed, non-signaled filter.

Clause 17B: The device of clause 11B, wherein the second filter comprises a signaled filter.

Clause 18B: The device of clause 11B, wherein: the third filter comprises a sample adaptive offset (SAO) filter and the third filtered block comprises an SAO-filtered block, and to process the third filtered block to determine the decoded version of the block of video data, the processing system is further configured to apply a second adaptive loop filter to the SAO-filtered block.

Clause 19B: The device of clause 11B, wherein the device comprises a wireless communication device, further comprising a receiver configured to receive a bitstream comprising an encoded version of the block of video data.

Clause 20B: The device of clause 19B, wherein the wireless communication device comprises a telephone handset and wherein the receiver is configured to demodulate, according to a wireless communication standard, a signal comprising the bitstream.

Clause 21B: The device of clause 11B, further comprising: a display, wherein to output the decoded version of the block of video data, the processing system is further configured to cause the display to display a picture that includes the decoded version of the block of video data.

Clause 22B: The device of clause 11B, wherein the device comprises one or more of a computer, a mobile device, a broadcast receiver device, or a set-top box.

Clause 23B: The device of clause 11B, further comprising: a camera configured to capture the video data, wherein the processing system is further configured to decode the block of video data as part of a video encoding process for encoding the video data.

Clause 24B: A computer-readable storage medium storing instructions that when executed by one or more processors cause the one or more processors to: apply a deblocking filter to a block of video data to determine a first filtered block; apply a second filter to the block of video data in parallel with the deblocking filter to determine a second filtered block, wherein the second filter comprises one of a guided filter, a bilateral filter, or an adaptive loop filter; combine the first filtered block and the second filtered block to determine a combined block; apply a third filter to the combined block to determine a third filtered block; process the third filtered block to determine a decoded version of the block of video data; and output the decoded version of the block of video data.

Clause 25B: The computer-readable storage medium of clause 24B, wherein to combine the first filtered block and the second filtered block to determine the combined block, the instructions cause the one or more processors to determine the combined block based on a weighted sum of samples of the first filtered block and samples of the second filtered block.

Clause 26B: The computer-readable storage medium of clause 25B, storing further instructions that when executed cause the one or more processors to: receive, in a bitstream comprising the video data, weighting values for determining the weighted sum of the samples of the first filtered block and the samples of the second filtered block.

Clause 27B: The computer-readable storage medium of clause 24B, wherein the third filter comprises a sample adaptive offset filter.

Clause 28B: The computer-readable storage medium of clause 24, wherein to process the third filtered block to determine the decoded version of the block of video data, the instructions cause the one or more processors to apply a second adaptive loop filter to the third filtered block.

Clause 29B: The computer-readable storage medium of clause 24B, wherein the second filter comprises a fixed, non-signaled filter.

Clause 30B: The computer-readable storage medium of clause 24B, wherein: the third filter comprises a sample adaptive offset (SAO) filter and the third filtered block comprises an SAO-filtered block, and to process the third filtered block to determine the decoded version of the block of video data, the instructions cause the one or more processors to apply a second adaptive loop filter to the SAO-filtered block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:

applying a deblocking filter to a set of samples of a block of video data to determine a first filtered block, wherein at least some values of the set of samples of the block of video data are different than values of corresponding samples of the first filtered block;

applying a second filter to the set of samples of the block of video data in parallel with the deblocking filter to determine a second filtered block, wherein at least some values of the set of samples of the block of video data are different than values of corresponding samples of the second filtered block, wherein the second filter comprises one of a guided filter, a bilateral filter, or an adaptive loop filter;

combining the first filtered block and the second filtered block to determine a combined block;

applying a third filter to the combined block to determine a third filtered block;

processing the third filtered block to determine a decoded version of the block of video data; and outputting the decoded version of the block of video data.

2. The method of claim 1, wherein combining the first filtered block and the second filtered block to determine the combined block comprises determining the combined block based on a weighted sum of samples of the first filtered block and samples of the second filtered block.

3. The method of claim 2, further comprising:

receiving, in a bitstream comprising the video data, weighting values for determining the weighted sum of the samples of the first filtered block and the samples of the second filtered block.

4. The method of claim 1, wherein the third filter comprises a sample adaptive offset filter.

5. The method of claim 1, wherein processing the third filtered block to determine the decoded version of the block of video data comprises applying a second adaptive loop filter to the third filtered block.

6. The method of claim 1, wherein the second filter comprises a fixed, non-signaled filter.

7. The method of claim 1, wherein the second filter comprises a signaled filter.

8. The method of claim 1, wherein:

the third filter comprises a sample adaptive offset (SAO) filter and the third filtered block comprises an SAO-filtered block, processing the third filtered block to determine the decoded version of the block of video data comprises applying a second adaptive loop filter to the SAO-filtered block.

9. The method of claim 1, wherein outputting the decoded version of the block of video data comprises one or more of outputting the decoded version of the block of video data for display or storing the decoded version of the block of video data.

10. The method of claim 1, wherein the method of decoding the video data is performed as part of a video encoding process, and wherein outputting the decoded version of the block of video data comprises storing the decoded version of the block of video data for encoding other blocks of the video data.

11. A device for decoding video data, the device comprising:

a memory system configured to store video data; and a processing system coupled to the memory system, implemented in circuitry, and configured to:

apply a deblocking filter to a set of samples of a block of video data to determine a first filtered block, wherein at least some values of the set of samples of the block of video data are different than values of corresponding samples of the first filtered block;

apply a second filter to the set of samples of the block of video data in parallel with the deblocking filter to determine a second filtered block, wherein at least some values of the set of samples of the block of video data are different than values of corresponding samples of the second filtered block, wherein the second filter comprises one of a guided filter, a bilateral filter, or an adaptive loop filter;

combine the first filtered block and the second filtered block to determine a combined block;

apply a third filter to the combined block to determine a third filtered block;

process the third filtered block to determine a decoded version of the block of video data; and output the decoded version of the block of video data.

12. The device of claim 11, wherein to combine the first filtered block and the second filtered block to determine the combined block, the processing system is further configured to determine the combined block based on a weighted sum of samples of the first filtered block and samples of the second filtered block.

13. The device of claim 12, wherein the processing system is further configured to:

receive, in a bitstream comprising the video data, weighting values for determining the weighted sum of the samples of the first filtered block and the samples of the second filtered block.

14. The device of claim 11, wherein the third filter comprises a sample adaptive offset filter.

15. The device of claim 11, wherein to process the third filtered block to determine the decoded version of the block of video data, the processing system is further configured to apply a second adaptive loop filter to the third filtered block.

16. The device of claim 11, wherein the second filter comprises a fixed, non-signaled filter.

17. The device of claim 11, wherein the second filter comprises a signaled filter.

18. The device of claim 11, wherein:

the third filter comprises a sample adaptive offset (SAO) filter and the third filtered block comprises an SAO-filtered block, and to process the third filtered block to determine the decoded version of the block of video data, the processing system is further configured to apply a second adaptive loop filter to the SAO-filtered block.

19. The device of claim 11, wherein the device comprises a wireless communication device, further comprising a receiver configured to receive a bitstream comprising an encoded version of the block of video data.

20. The device of claim 19, wherein the wireless communication device comprises a telephone handset and wherein the receiver is configured to demodulate, according to a wireless communication standard, a signal comprising the bitstream.

21. The device of claim 11, further comprising:

a display, wherein to output the decoded version of the block of video data, the processing system is further configured to cause the display to display a picture that includes the decoded version of the block of video data.

22. The device of claim 11, wherein the device comprises one or more of a computer, a mobile device, a broadcast receiver device, or a set-top box.

23. The device of claim 11, further comprising:

a camera configured to capture the video data, wherein the processing system is further configured to decode the block of video data as part of a video encoding process for encoding the video data.

24. A non-transitory computer-readable storage medium storing instructions that when executed by one or more processors cause the one or more processors to:

apply a deblocking filter to a set of samples of a block of video data to determine a first filtered block, wherein at least some values of the set of samples of the block of video data are different than values of corresponding samples of the first filtered block;

apply a second filter to the set of samples of the block of video data in parallel with the deblocking filter to determine a second filtered block, wherein at least some values of the set of samples of the block of video data are different than values of corresponding samples of the second filtered block, wherein the second filter comprises one of a guided filter, a bilateral filter, or an adaptive loop filter;

combine the first filtered block and the second filtered block to determine a combined block;

apply a third filter to the combined block to determine a third filtered block;

process the third filtered block to determine a decoded version of the block of video data; and output the decoded version of the block of video data.

25. The non-transitory computer-readable storage medium of claim 24, wherein to combine the first filtered block and the second filtered block to determine the combined block, the instructions cause the one or more processors to determine the combined block based on a weighted sum of samples of the first filtered block and samples of the second filtered block.

26. The non-transitory computer-readable storage medium of claim 25, storing further instructions that when executed cause the one or more processors to:

receive, in a bitstream comprising the video data, weighting values for determining the weighted sum of the samples of the first filtered block and the samples of the second filtered block.

27. The non-transitory computer-readable storage medium of claim 24, wherein the third filter comprises a sample adaptive offset filter.

28. The non-transitory computer-readable storage medium of claim 24, wherein to process the third filtered block to determine the decoded version of the block of video data, the instructions cause the one or more processors to apply a second adaptive loop filter to the third filtered block.

29. The non-transitory computer-readable storage medium of claim 24, wherein the second filter comprises a fixed, non-signaled filter.

30. The non-transitory computer-readable storage medium of claim 24, wherein:

the third filter comprises a sample adaptive offset (SAO) filter and the third filtered block comprises an SAO-filtered block, and to process the third filtered block to determine the decoded version of the block of video data, the instructions cause the one or more processors to apply a second adaptive loop filter to the SAO-filtered block.

* * * * *